US009872267B2

(12) United States Patent
Lee et al.

(10) Patent No.: US 9,872,267 B2
(45) Date of Patent: Jan. 16, 2018

(54) METHOD FOR SIGNAL TRANSMISSION IN DEVICE-TO-DEVICE COMMUNICATION AND APPARATUS THEREFOR

(71) Applicant: LG ELECTRONICS INC., Seoul (KR)

(72) Inventors: Jihyun Lee, Seoul (KR); Seungmin Lee, Seoul (KR); Hakseong Kim, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 55 days.

(21) Appl. No.: 14/905,272

(22) PCT Filed: Jul. 31, 2014

(86) PCT No.: PCT/KR2014/007040
§ 371 (c)(1),
(2) Date: Jan. 14, 2016

(87) PCT Pub. No.: WO2015/016630
PCT Pub. Date: Feb. 5, 2015

(65) Prior Publication Data
US 2016/0183208 A1 Jun. 23, 2016

Related U.S. Application Data

(60) Provisional application No. 61/861,967, filed on Aug. 2, 2013.

(51) Int. Cl.
*H04J 3/06* (2006.01)
*H04W 56/00* (2009.01)
(Continued)

(52) U.S. Cl.
CPC ......... *H04W 56/004* (2013.01); *H04W 4/008* (2013.01); *H04W 72/0446* (2013.01);
(Continued)

(58) Field of Classification Search
CPC .............. H04W 56/004; H04W 4/008; H04W 72/0446; H04W 72/1278; H04W 76/023; H04W 88/02
(Continued)

(56) References Cited

U.S. PATENT DOCUMENTS

| 6,600,758 B1 * | 7/2003 | Mazur | H04W 36/0088 |
| | | | 370/350 |
| 2010/0169498 A1 * | 7/2010 | Palanki | H04W 16/14 |
| | | | 709/228 |

(Continued)

FOREIGN PATENT DOCUMENTS

| CN | WO 2013078967 A1 * | 6/2013 | ............ H04W 24/10 |
| KR | 10-2008-0113837 | 12/2008 | |

(Continued)

OTHER PUBLICATIONS

Intel Corporation, "Discussion on design options for D2D communication," 3GPP TSG-RAN WG1 #73, R1-131925, May 2013, 5 pages.

(Continued)

*Primary Examiner* — Peter Cheng
(74) *Attorney, Agent, or Firm* — Lee Hong Degerman Kang Waimey

(57) ABSTRACT

Disclosed is a method for receiving a signal of a terminal configured to perform device-to-device (D2D) communication in a wireless communication system according to an embodiment of the present invention. The method may comprises the steps of: receiving a message containing information about a specific signal from a serving base station; checking whether the specific signal is an inter-cell broadcast signal to be transmitted by a peer terminal which is served by a neighboring base station, on the basis of the information contained in the message; and receiving the inter-cell broadcast signal from the peer terminal using the (Continued)

information contained in the message and information about a synchronization difference between the serving base station and the neighboring base station, if the specific signal is the inter-cell broadcast signal.

12 Claims, 22 Drawing Sheets

(51) Int. Cl.
*H04W 4/00* (2009.01)
*H04W 72/04* (2009.01)
*H04W 76/02* (2009.01)
*H04W 72/12* (2009.01)
*H04W 88/02* (2009.01)

(52) U.S. Cl.
CPC ..... *H04W 72/1278* (2013.01); *H04W 76/023* (2013.01); *H04W 88/02* (2013.01)

(58) Field of Classification Search
USPC .......................................... 370/350
See application file for complete search history.

(56) References Cited

U.S. PATENT DOCUMENTS

| | | | |
|---|---|---|---|
| 2011/0182280 A1 | 7/2011 | Charbit et al. | |
| 2011/0268101 A1* | 11/2011 | Wang | H04L 5/0053 370/344 |
| 2012/0258706 A1 | 10/2012 | Yu et al. | |
| 2012/0269172 A1* | 10/2012 | Chin | H04W 36/32 370/332 |

FOREIGN PATENT DOCUMENTS

| | | |
|---|---|---|
| KR | 20120037963 | 4/2012 |
| KR | 20120074255 | 7/2012 |
| KR | 20130023598 | 3/2013 |
| KR | 20130065373 | 6/2013 |
| WO | 2013/077684 | 5/2013 |
| WO | 2013/109100 | 7/2013 |

OTHER PUBLICATIONS

PCT International Application No. PCT/KR2014/007040, Written Opinion of the International Searching Authority dated Nov. 11, 2014, 14 pages.

* cited by examiner

METHOD FOR SIGNAL TRANSMISSION IN DEVICE-TO-DEVICE COMMUNICATION AND APPARATUS THEREFOR

CROSS-REFERENCE TO RELATED APPLICATIONS

This application is the National Stage filing under 35 U.S.C. 371 of International Application No. PCT/KR2014/007040, filed on Jul. 31, 2014, which claims the benefit of U.S. Provisional Application No. 61/861,967, filed on Aug. 2, 2013, the contents of which are all hereby incorporated by reference herein in their entirety.

TECHNICAL FIELD

The present invention relates to a wireless communication system, and more particularly, to a method for signal transmission in device-to-device communication and apparatus therefor.

BACKGROUND ART

In cellular communication, a terminal which is present in a cell accesses a base station to perform communication, receives control information for exchange of data from the base station, and then exchanges data with the base station. In other words, since the terminal exchanges data through the base station, in order to transmit data to another cellular terminal, the terminal transmits the data to the base station, and the base station receiving the data delivers the received data to the other cellular terminal. In this way, when one terminal transmits data to another terminal, the data can be transmitted through the base station. Therefore, the base station schedules a channel and a resource for data exchange, and transmits channel and resource scheduling information to respective terminals. As described above, when communication between terminals is to be performed through the base station, channels and resources for data exchange need to be allocated to the respective terminals from the base station. However, in device-to-device (D2D) communication, a terminal transmits data without using the based station or a repeater, and thus directly exchanges a signal with a desired terminal.

If device-to-device (D2D) communication of a user equipment is configured, while the user equipment and a target user equipment belong to different cells, the target user equipment may not receive information broadcasted by a serving cell of the user equipment. Accordingly, discussion needs to be made on a method of supporting D2D communication between cells, particularly, on a method of enabling a specific user equipment to receive a signal transmitted from a peer user equipment belonging to another cell.

DISCLOSURE OF THE INVENTION

Technical Task

The technical task of the present invention is to provide a method of supporting to perform communication for D2D communication in a wireless communication efficiently.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

According to an embodiment of the present invention, disclosed is a method of receiving a signal by a user equipment configured to perform D2D (device-to-device) communication in a wireless communication system. The method may include the steps of receiving a message including information on a specific signal from a serving base station, determining whether the specific signal corresponds to an inter-cell broadcast signal to be transmitted by a peer user equipment served by a neighboring base station based on the information included in the message, and if the specific signal corresponds to the inter-cell broadcast signal, receiving the inter-cell broadcast signal from the peer user equipment using the information included in the message and information on a synchronization difference between the serving base station and the neighboring base station.

Additionally or alternatively, information on a signal to be transmitted by the peer user equipment may include at least one of resource allocation information for the signal, a modulation and coding scheme, TA (timing advance) information, an index of a subframe to which transmission of the signal is assigned, and a cell ID (identifier) of the neighboring base station.

Additionally or alternatively, information on a signal to be transmitted by the peer user equipment is received by the serving base station from the neighboring base station through a backhaul link and a transmission timing of the message may be determined in a prescribed range from a reception timing of the information on the signal to be transmitted by the peer user equipment.

Additionally or alternatively, the information on the synchronization difference may include information on a subframe difference between the serving base station and the neighboring base station, and the information on the subframe difference may include a subframe index difference and symbol spacing between subframe boundaries of the serving base station and the neighboring base station.

Additionally or alternatively, the information on the synchronization difference may include indices of subframes, which correspond to a specific subframe of the serving base station, of the neighboring base station.

Additionally or alternatively, the message may include geographic coordinate information of the peer user equipment Additionally or alternatively, the method may further include the step of adjusting a propagation delay depending on a distance from the peer user equipment using the geographic coordinate information.

According to another embodiment of the present invention, disclosed is a user equipment configured to perform D2D (device-to-device) communication in a wireless communication system. The user equipment includes a radio frequency (RF) unit and a processor configured to control the RF unit, wherein the processor may be configured to receive a message including information on a specific signal from a serving base station, to determine whether the specific signal corresponds to an inter-cell broadcast signal to be transmitted by a peer user equipment served by a neighboring base station based on the information included in the message, and, if the specific signal corresponds to the inter-cell broadcast signal, to receive the inter-cell broadcast signal from the peer user equipment using the information included in the message and information on a synchronization difference between the serving base station and the neighboring base station.

Additionally or alternatively, information on a signal to be transmitted by the peer user equipment may include at least one of resource allocation information for the signal, a modulation and coding scheme, TA (timing advance) information, an index of a subframe to which transmission of the signal is assigned, and a cell ID (identifier) of the neighboring base station.

Additionally or alternatively, information on a signal to be transmitted by the peer user equipment is received by the serving base station from the neighboring base station through a backhaul link and a transmission timing of the message may be determined in a prescribed range from a reception timing of the information on the signal to be transmitted by the peer user equipment.

Additionally or alternatively, the information on the synchronization difference may include information on a subframe difference between the serving base station and the neighboring base station, and the information on the subframe difference may include a subframe index difference and symbol spacing between subframe boundaries of the serving base station and the neighboring base station.

Additionally or alternatively, the information on the synchronization difference may include indices of subframes, which correspond to a specific subframe of the serving base station, of the neighboring base station.

Additionally or alternatively, the message may include geographic coordinate information of the peer user equipment Additionally or alternatively, the method may further include the step of adjusting a propagation delay depending on a distance from the peer user equipment using the geographic coordinate information.

The above technical solutions are merely some parts of the embodiments of the present invention and various embodiments into which the technical features of the present invention are incorporated can be derived and understood by those skilled in the art from the following detailed description of the present invention.

Advantageous Effects

According to an embodiment of the present invention, D2D communication can be efficiently performed in a wireless communication system.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE FOR INVENTION

Figure 1:
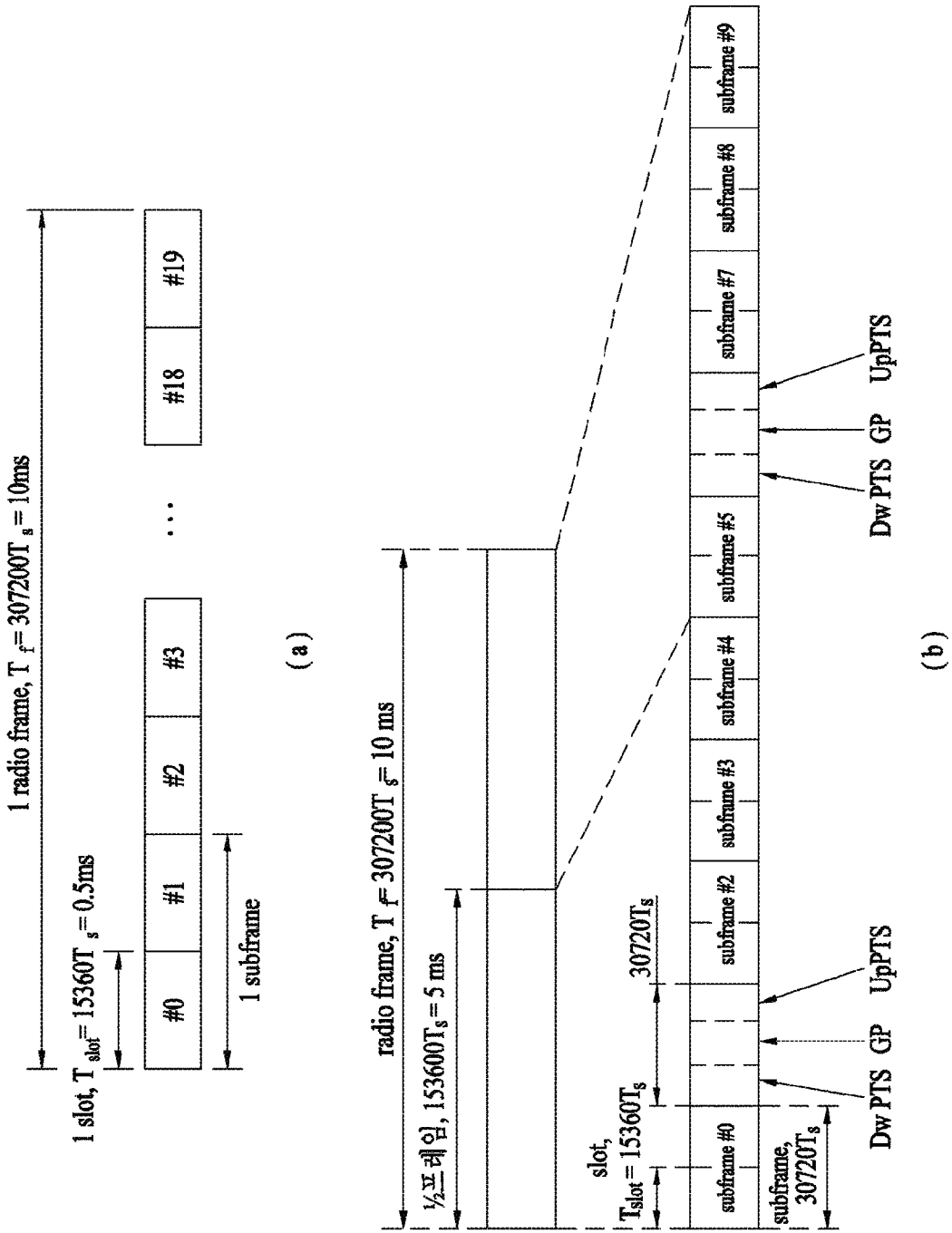
FIG. 1 is a diagram for one example of a radio frame structure used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g. macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowlegement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

Figure 2:
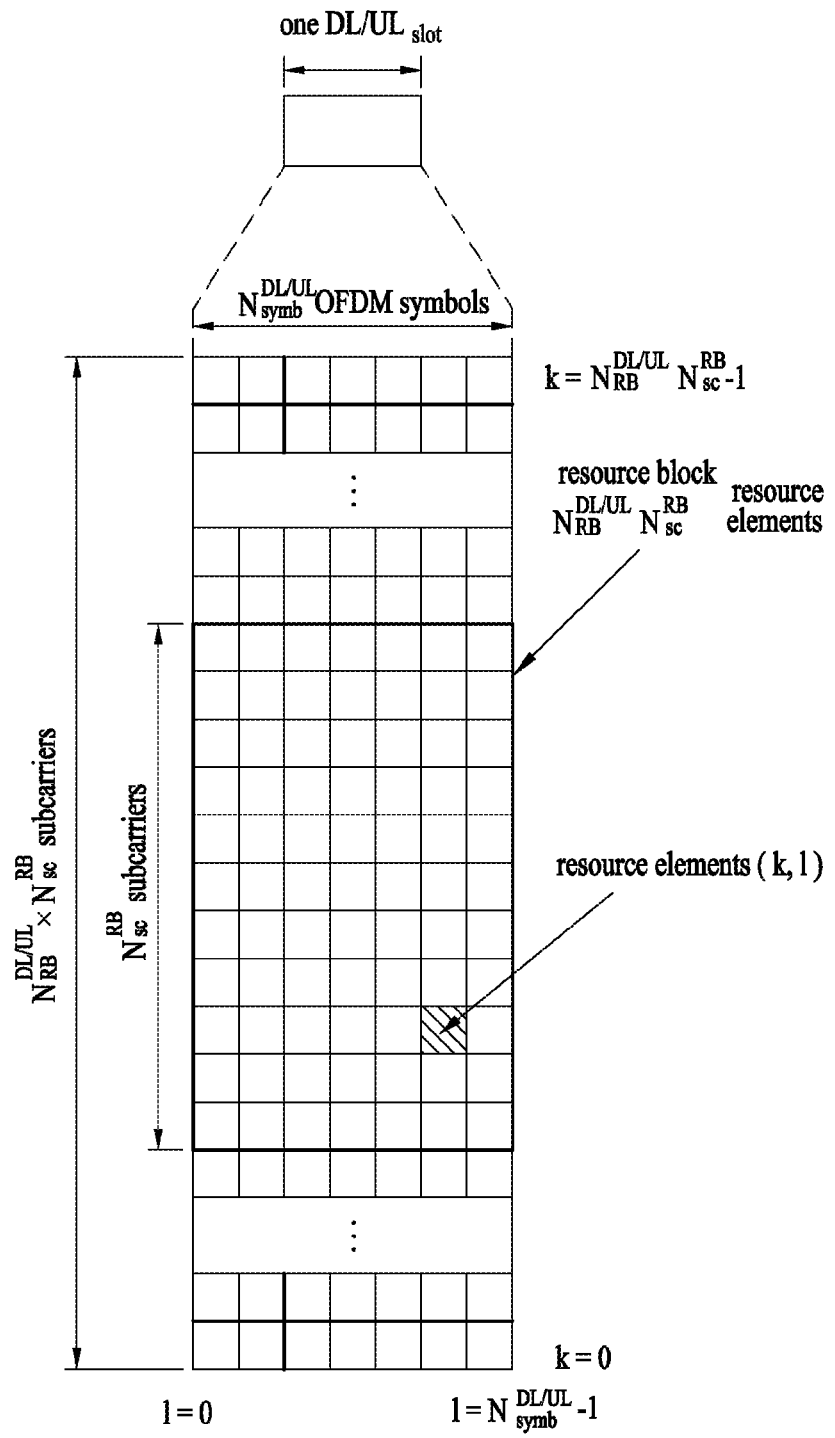
FIG. 2 is a diagram for one example of downlink/uplink (DL/UL) slot in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL}*N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6

OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g. 7) consecutive OFDM symbols in the time domain and $N_{sc}^{RB}$ (e.g. 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k,l) in a slot. Here, k is an index in the range of 0 to $N_{symb}^{DL/UL} * N_{sc}^{RB} - 1$ in the frequency domain and l is an index in the range of 0 to $N_{symb}^{DL/UL} - 1$.

Two RBs, which occupy $N_{sc}^{RB}$ same continuous subcarriers for one subframe and are respectively located at two slots of the subframe, will be referred to as a pair of physical resource blocks (PRB). The two RBs constituting the PRB have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to NDLVRB−1, and NDLVRB=NDLRB is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
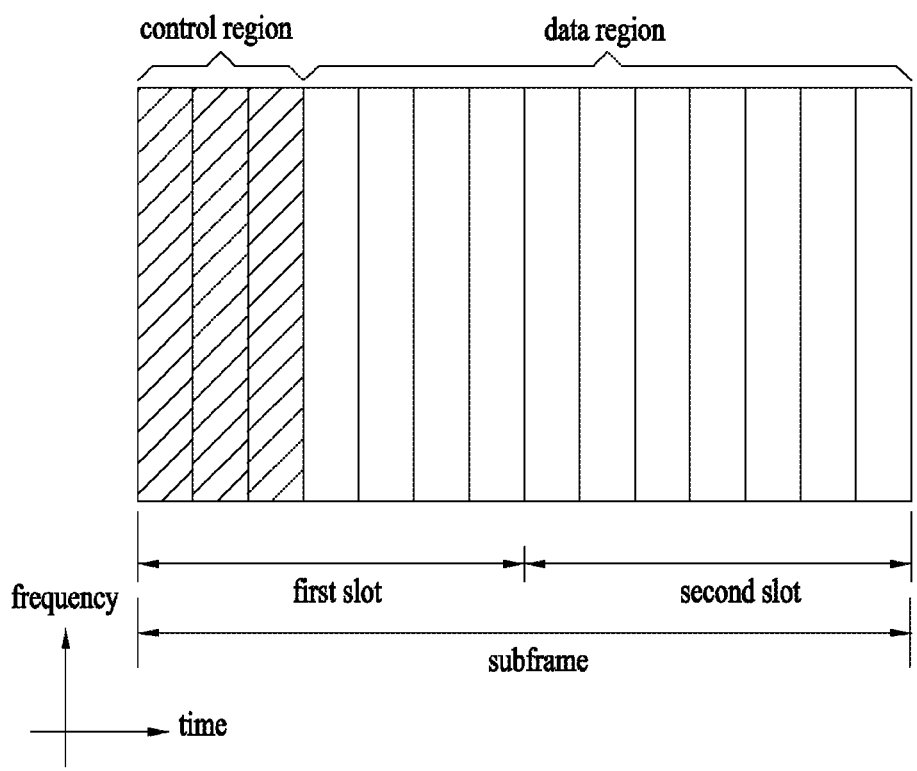
FIG. 3 is a diagram for one example of a downlink (DL) subframe structure used in 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. The aggregation levels defining the search space are indicated as follows:

TABLE 3

| Type | Aggregation Level L | Size [in CCEs] | Number of PDCCH candidates $M^{(L)}$ |
|---|---|---|---|
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g. frequency position) of "B" and transmission format information (e.g. transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
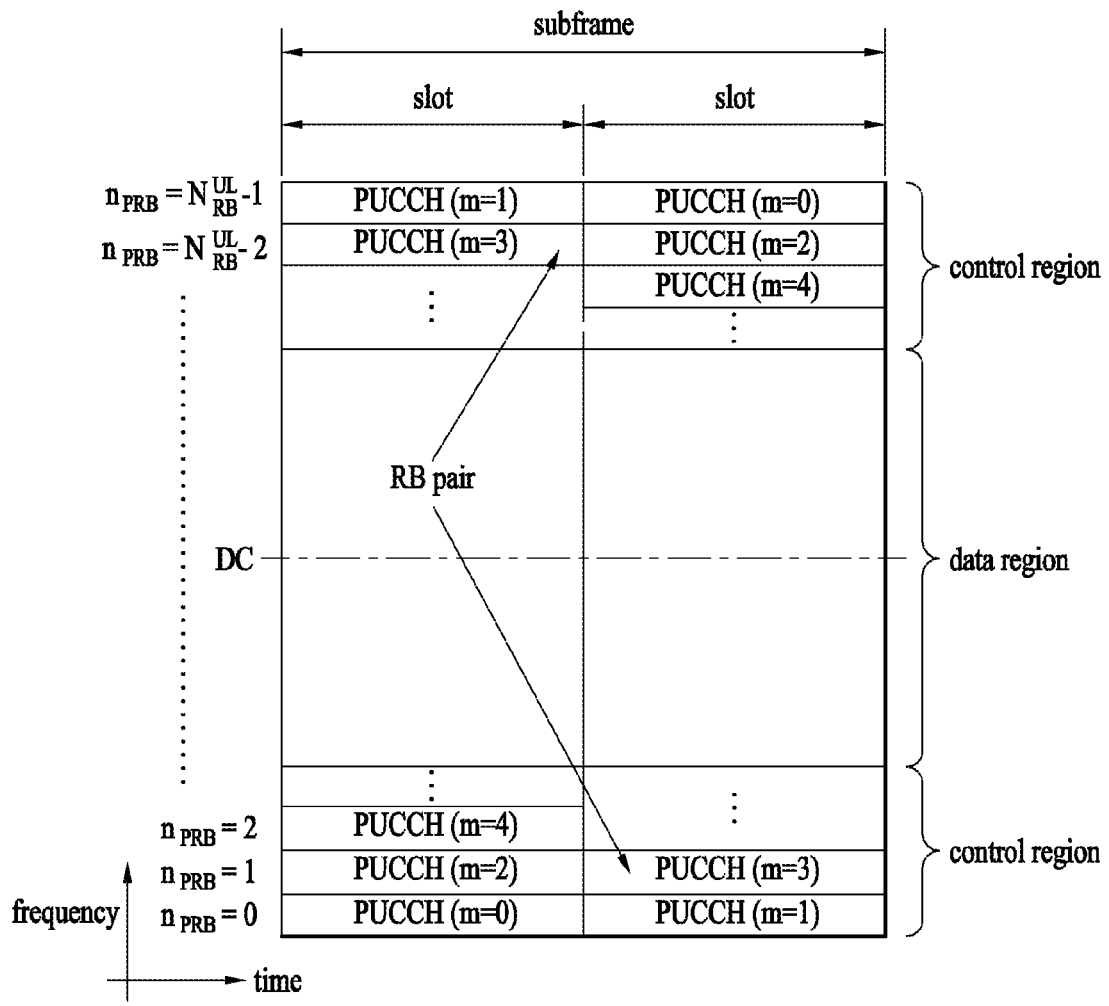
FIG. 4 is a diagram for one example of an uplink (UL) subframe structure used in 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon. Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

The present invention proposes a scheme for a UE to receive D2D (device-to-device) broadcast information, particularly, in case that a D2D Tx UE, which transmits the D2D broadcast information, and a D2D Rx UE (i.e., a peer UE of the D2D Tx UE) belong to different cells. Here, the D2D broadcast information means information contained in a broadcast signal transmitted between UEs through a radio channel. And, the case that the UEs belong to the different cells means a case that the UEs are served by eNBs in different cells, respectively.

If the D2D Tx UE transmitting the D2D broadcast information and the D2D Rx UE are located in the same cell, it is assumed that the D2D broadcast information is transceived using a single-cell D2D broadcast procedure. The single-cell D2D broadcast procedure is described as follows.

Although the following steps of the single-cell D2D broadcast procedure corresponds to a procedure generally applied to several proposed methods, the procedure may not be applied to a specific proposed method. For the convenience of the explanation, the single-cell D2D broadcast procedure can be divided as follows.

Step 1 (MSG1):

A signal for informing that D2D broadcast/groupcast signal transmission (scheduled to be performed in a step 3) will be attempted later according to a prescribed rule is transmitted. For the convenience, the above-mentioned signal is referred to as MSG1. MSG1 is transferred from a D2D Tx UE to a specific eNB. Depending on a method, other D2D UEs may receive MSG1 (overhearing).

Step 2 (MSG2):

As a response to the step 1 from an eNB, the eNB transfers information (e.g., resource allocation, power control, timing advance, CP (cyclic prefix) length, etc.) necessary for the D2D Tx UE that requests the step 1 to transmit a D2D broadcast/groupcast signal. The above-mentioned signal is referred to as MSG2.

Step 3 (MSG3):

This corresponds to a process for the D2D Tx UE, which requests the step 1, to transfer the D2D broadcast/groupcast signal to a D2D Rx UE in accordance with information included in the MSG2 received in the step 2. In some cases, it may be limitedly transferred to D2D Rx UEs (or, a group of Rx UEs) (i.e., receiving objects may be limited). Alternatively, in some cases, the eNB may be configured to perform an appropriate response operation (e.g., after receiving the D2D broadcast/groupcast signal, the eNB may forward it to the D2D Rx UE or transmit it repeatedly) in a manner of receiving MSG3. The above-mentioned signal is referred to as MSG3.

Step 4 (MSG4):

As an operation of assisting the step 3 to be performed normally, it corresponds to a step of performing a related operation depending on whether signal reception is successful. In the case of failure in receiving the signal, a related operation is performed depending on how wrong the reception is performed or which channel the reception is performed through.

As mentioned in the foregoing description, the eNB may broadcast/groupcast the message received in the step 3 (i.e., MSG3) to D2D Rx UEs or a D2D Rx UE group in the step 4. The above-mentioned signal is referred to as MSG4.

Figure 5:
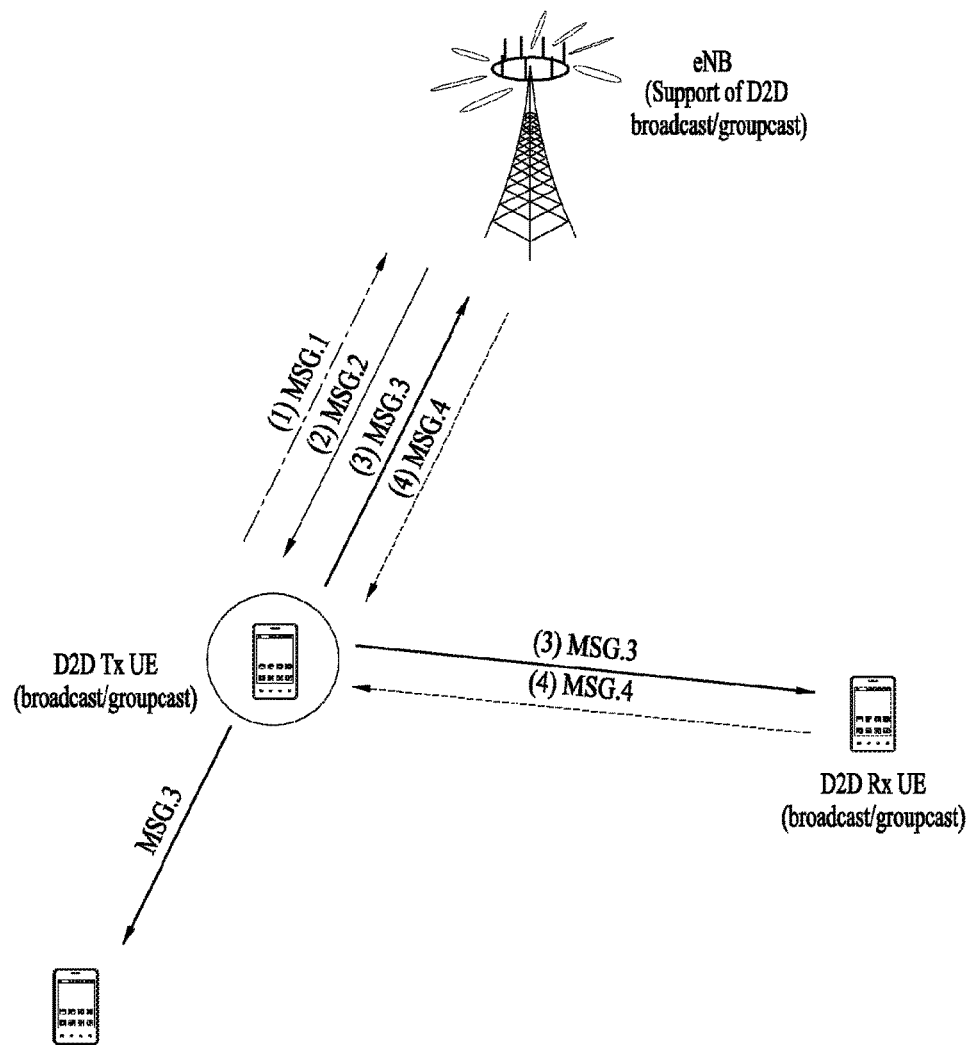
FIG. 5 is a diagram to describe a single-cell D2D broadcast/groupcast scheme used in device-to-device (D2D) communication.

D2D broadcast/groupcast scenarios based on various types of RACHs (random access channels) are described with reference to all or parts of the procedure. In FIG. 5, it is assumed that a D2D Tx UE (1) transmits a broadcast scheduling request (MSG1), (2) receives response (MSG2) to (1), and (3) transmits a broadcast signal (MSG3) to a D2D Rx UE in direct or transmits the broadcast signal (MSG3) in consideration of eNB overhearing. It is advantageous in that a simplest D2D broadcast/groupcast signal transmission can be implemented by maximizing the conventional procedure or functions (e.g., preamble, resource, RA-RNTI (random access radio network temporary identifier), request/response, contention resolution, timing, etc.). In this case, it may be divided into a case that MSG4 is required and a case that MSG4 is not required.

Figure 6:
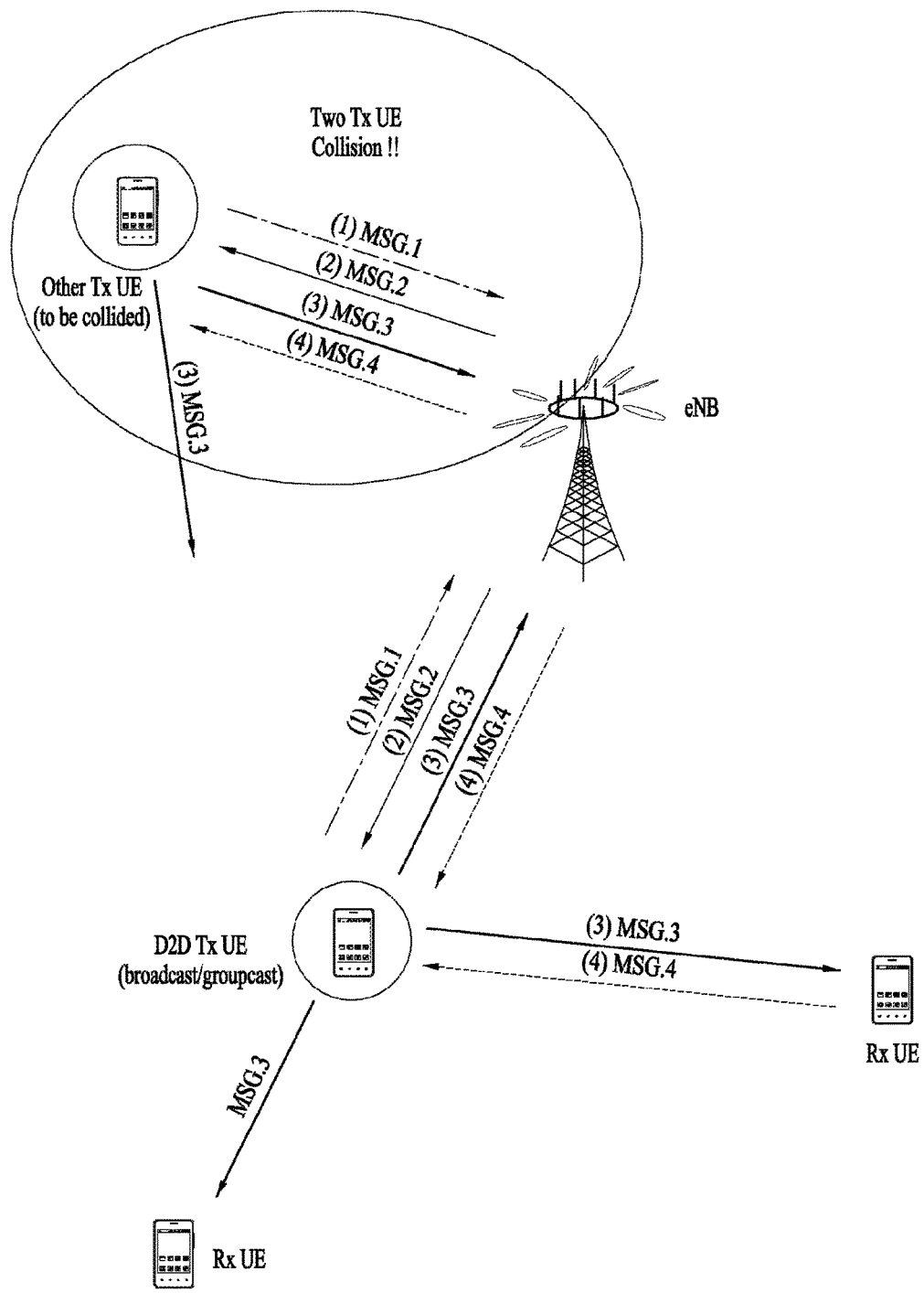
FIG. 6 is a diagram for an example of a collision caused by D2D broadcast/groupcast from two UEs.

FIG. 6 illustrates a situation that a collision occurs due to simultaneous broadcasting attempts made by two D2D Tx UEs. In this case, a scheme such as contention resolution introduced in a RACH procedure may be applied. Alternatively, a preamble structure designed to reduce collision probability may be used. In FIG. 5, a method of omitting MSG4 may be considered in some cases. However, in FIG. 6, if contention resolution using MSG4 is introduced, an eNB should transmit MSG4 mandatorily so that a D2D Tx UE recognizes whether the collision occurs.

Figure 7:
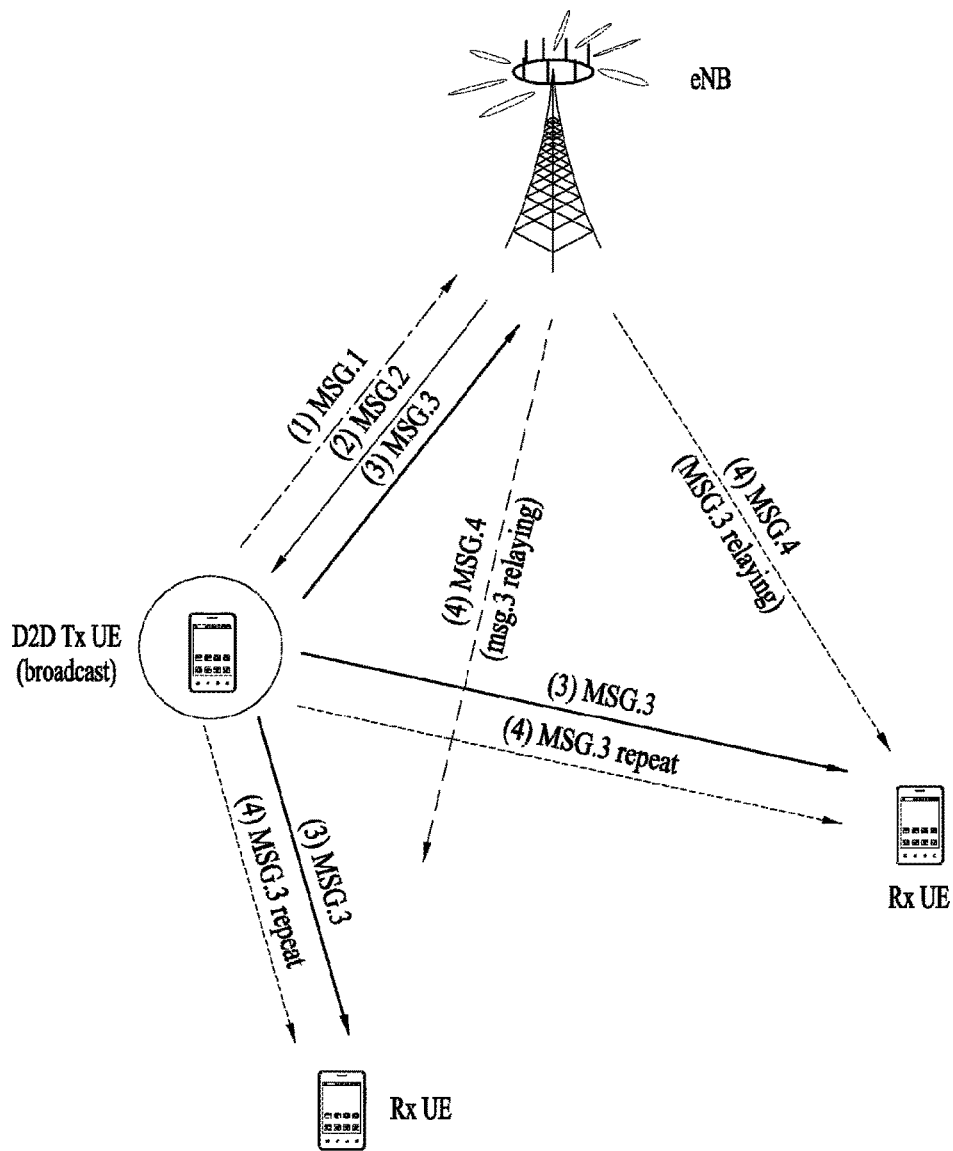
FIG. 7 is a diagram of inter-cell D2D broadcast/groupcast according to one embodiment of the present invention.

On the other hand, FIG. 7 illustrates a method for a D2D Rx UE to combine D2D broadcast/groupcast signals. In particular, unlike FIG. 5, a D2D broadcast/groupcast signal is transmitted by not only a D2D Tx UE but also an eNB or a device having a relaying function in FIG. 7. After receiving information on the D2D broadcast signal or overhearing, the eNB transmits MSG 4 as shown in FIG. 7 so that the D2D Rx UE may combine the D2D broadcast signals. Considering it as a time-based procedure, a timing at which the D2D Tx UE transmits (or broadcasts) MSG3 needs to be set different from a timing at which the eNB transmits MSG4.

In the case of TDD system, if an eNB is designed to transmit MSG 4 at the timing at which a D2D Tx UE transmits MSG3, the eNB receives MSG3 from the D2D Tx UE and should transmit MSG4 at the same time since the same frequency is used. Thus, it may be considered as an undesirable design. If a transmission timing of MSG3 is set different from a transmission timing of MSG4, the purpose of transferring the D2D broadcast/groupcast signal to a D2D Rx UE and the purpose of transferring the D2D broadcast/ groupcast signal (for relaying) to the eNB can be accomplished at the same time by one-time MSG3 transmission from the D2D Tx UE.

On the contrary, since a UE uses D2D UL spectrum and an eNB uses DL spectrum in FDD, it has more flexibility in timing design. It is even possible that MSG3 is received from a D2D Tx UE and is relayed at the same time. In particular, compared to the TDD, latency is more likely to be reduced in the timing design in the FDD.

Moreover, it may be also considered that the D2D Tx UE simultaneously transmits MSG3 at a timing at which the eNB transmits MSG4. In doing so, a signal combination gain can be obtained from the point of view of a D2D Rx UE. In this case, a simple transmission method using the same format, superposition coding, any combination thereof may be used.

In this case, an operating procedure may be changed depending on a role of MSG4. In aspect of the D2D Tx UE, if MSG4 transmitted by the corresponding D2D Tx UE is considered as MSG4 response from the eNB, a reception timing of MSG4 in the D2D Tx UE (in case that a timing for MSG4 in the D2D broadcast/groupcast procedure is previously determined, similar to a transmission/reception timing of message 4 in an RACH procedure) should be different from a transmission timing of MSG4 (including MSG3) in the eNB.

Alternatively, after confirming that the eNB securely receives MSG3 from the D2D Tx UE, the eNB should transmit MSG4 at a special MSG4 (i.e., new MSG4 designed to contain the same format as that of MSG3 or the contents of MSG3) transmission timing, which is determined according to the predefined rule. In this case, if the eNB relays or repeats the same format as that of MSG3 through MSG4, a reception gain of the D2D Rx UE can be increased in a manner that the D2D transmits MSG3 together at the same timing. In case that a different format of MSG4 is transmitted, if the D2D Tx UE generates a format identical to the different format and then transmits MSG4 having the format, it is expected to obtain the same gain. In this case, transmission may be repeated several times in consideration of paging and DRX (discontinuous reception) cycle of the D2D Rx UE. Therefore, the D2D Rx UE comes out of sleep mode and may then receive the D2D broadcast/groupcast signal one or more times.

Figure 8:
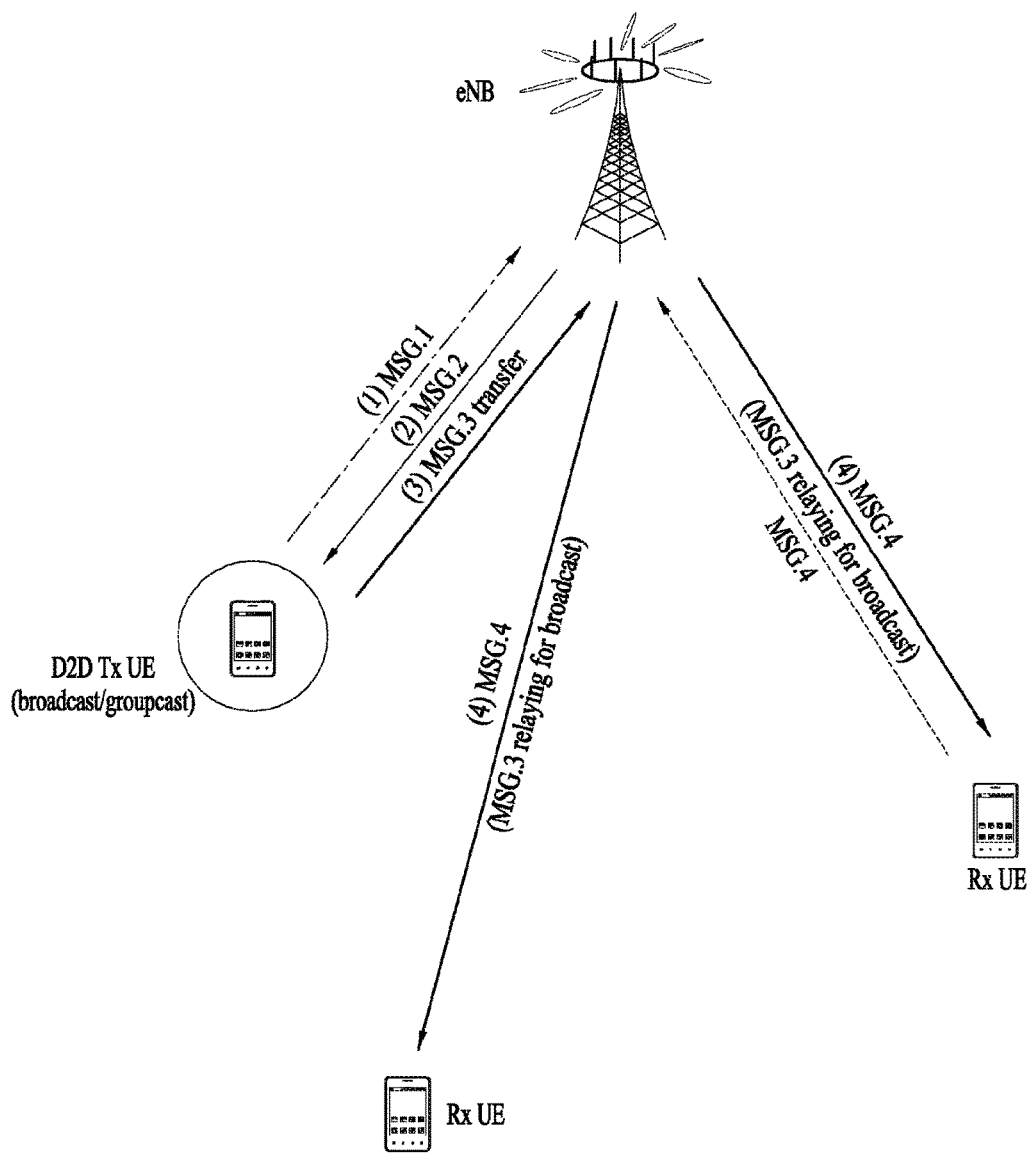
FIG. 8 is a diagram of inter-cell D2D broadcast/groupcast according to one embodiment of the present invention.

FIG. 8 illustrates a method of transmitting a D2D broadcast/groupcast signal according to one embodiment of the present invention. Although the D2D broadcast/groupcast signal is generated by a D2D Tx UE similar to the above-mentioned description, transmission of the D2D broadcast/groupcast signal is not performed by the D2D Tx UE. Instead, the transmission of the D2D broadcast/groupcast signal is delegated to an entity (e.g., eNB, relay, UE relay, etc.) that has a capability of performing broadcasting/groupcasting better. Therefore, benefit such as extension in an area where the D2D broadcast/groupcast is transferred, improved reception rate, reduction in burden of transmission processing, decreased power consumption, and the like may be achieved.

In this case, it may be preferred that the D2D broadcast/groupcast signal is transmitted together with MSG1 for a simple procedure.

Meanwhile, if the eNB serving the D2D Tx UE is not the same as an eNB serving the D2D Rx UE, the D2D Rx UE may not receive MSG2 transmitted by the eNB serving the D2D Tx UE in general since the D2D Rx UE attempts to detect MSG2 transmitted from the eNB in the cell to which the D2D Rx UE belongs at a paging reception timing or a predetermined MSG2 reception timing. In particular, MSG2 detection attempts of D2D UEs belonging to different cells are performed with regard to different eNBs at different timings. Moreover, even if the D2D Rx UE is located in an area in which communication with the D2D Tx UE is possible, the D2D Rx UE may be in a location in which a signal transmitted by the eNB serving the D2D Tx UE cannot be received successfully. In this case, there is no way for the D2D Rx UE to directly receive MSG2 transmitted by the eNB serving the D2D Tx UE. To overcome such a problem, required is a method for a D2D Rx UE to obtain scheduling information (MSG2) in MSG3, which corresponds to D2D broadcast/groupcast information, or the D2D broadcast/groupcast information (MSG3) directly or indirectly.

Therefore, to receive D2D broadcast/groupcast information of a D2D Rx UE belonging to a different cell, an eNB and a UE may operates as follows.

1$^{st}$ Embodiment

Figure 9:
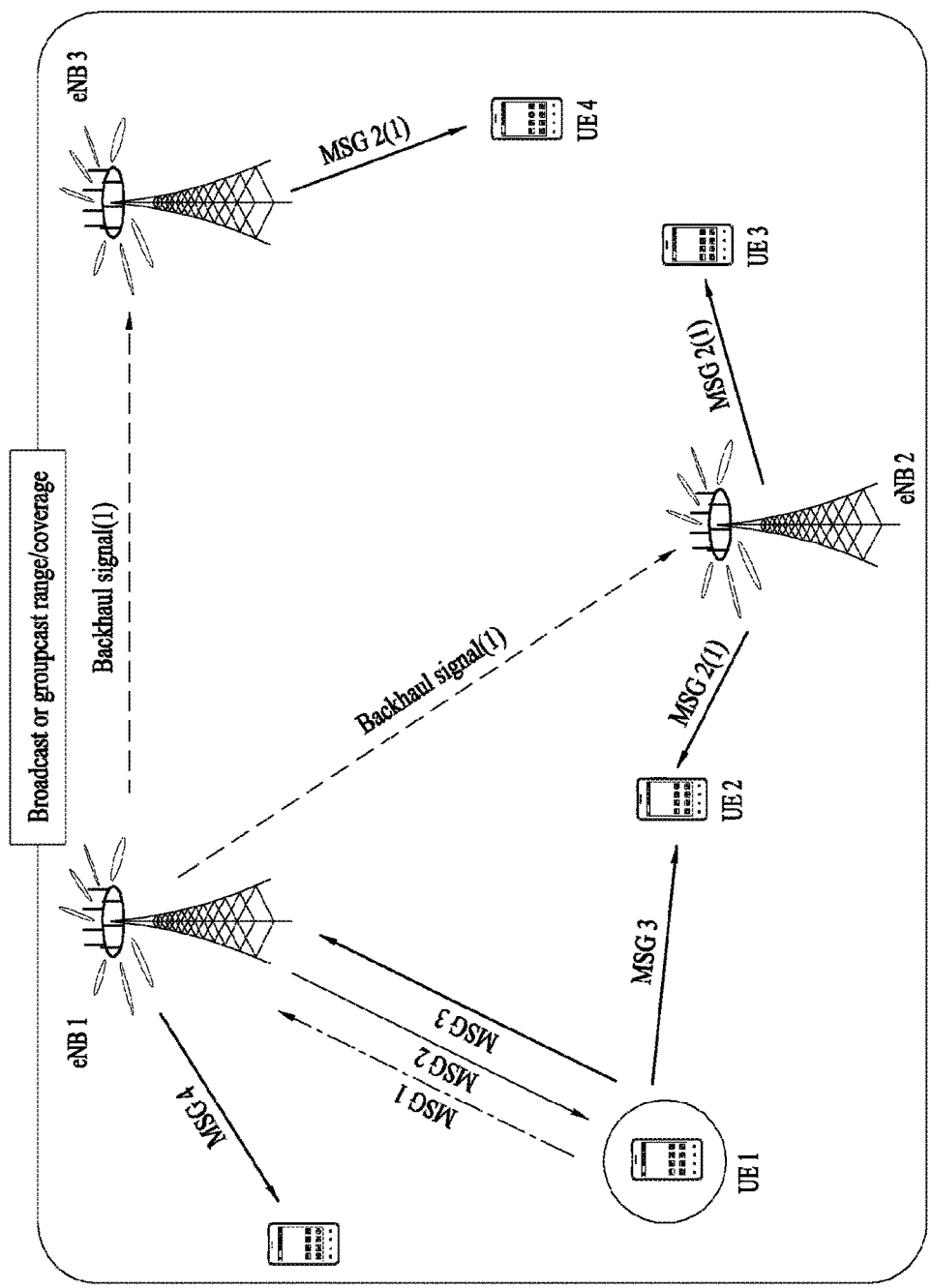
FIG. 9 is a diagram of inter-cell D2D broadcast/groupcast according to one embodiment of the present invention.

According to a 1$^{st}$ embodiment, an eNB transfers information of MSG2 to a neighboring eNB and then the neighboring eNB may transmit scheduling information of MSG3 to UEs served by the neighboring eNB. In particular, the neighboring eNB transfers information corresponding to MSG2, which is transmitted by the eNB, to UE2 corresponding to a D2D Rx UE. FIG. 9 illustrates the 1$^{st}$ embodiment of the present invention.

D2D Tx UE Operation

Operations of UE1 corresponding to a D2D Tx UE are the same as those of D2D broadcast/groupcast signal transmission in the single cell. However, in case that cell ID in received MSG2 is not identical to cell ID of a cell to which UE1 belongs, the UE1 should transmit MSG3 based on time of an eNB having the cell ID contained in the received MSG2.

eNB Operation

If eNB1 receives MSG1 from the UE1, the eNB1 transfer the following information to neighboring eNB2 and eNB3. Here, neighboring eNBs may mean the rest of eNBs in an eNB group to which an eNB belongs, except the corresponding eNB. The eNB group means a set of eNBs adjacent to each other and it may be previously determined in a random manner and standard.

Backhaul Signal (1)
Information included in MSG2, RA (resource allocation) information of MSG3, and information on MCS (modulation and coding scheme), TA (timing advance) and the like are included.
Scheduling information of MSG3
Cell ID If the eNB2 and the eNB3 receive the backhaul signal (1) from the eNB1, the eNB2 and the eNB3 transmit MSG2 as the same as when receiving MSG1 from UEs served by them. In this case, MSG2 includes the following information.

MSG2 (1)
Information included in MSG2, RA (resource allocation) information of MSG3, and information on MCS (modulation and coding scheme), TA (timing advance) and the like are included.
Scheduling information of MSG3
Cell ID The scheduling information of MSG3 corresponds to an SF index (and a symbol number) to which transmission of MSG3 is assigned when time of an eNB corresponding to the cell ID is set as reference. And, the cell ID means ID of a cell that becomes reference time of the scheduling information of MSG3. The cell ID may be with respect to a pre-specified eNB in the eNB group so as to become a time reference for D2D. In this case, MSG2 (1) may not include the cell ID.

The reason for why the scheduling information of MSG3 is included in MSG2 (1) is that it is difficult to define a transmission timing of MSG3 to be derived from a transmission timing of MSG2. In the case of the RACH procedure, MSG3 is transmitted through PUSCH of UL SF that appears first after 6 SFs from an RAR reception timing. In particular, MSG2 transmitted by an eNB is intended for many unspecified UEs which belong to the eNB and the reception timing of MSG2 may vary in aspect of each of the UEs. In this regard, in determining the transmission timing of MSG3, time required until the D2D Rx UE receives MSG2, e.g., time required for backhaul signal transmission, and paging time of the D2D Rx UE should be sufficiently secured in the D2D broadcast/groupcast scheme, unlike the case of the single cell.

In order to facilitate scheduling of MSG3 and enable D2D Rx UEs (e.g., UE2, UE3 and UE4) to perform MSG2 (1) reception before MSG3 transmission, restrictions on MSG2 (1) transmission timings of the eNB2 and the eNB3 may be required. For example, if the eNB2 and the eNB3 receives the backhaul signal (1), they may be restricted to complete MSG2 (1) transmission in a specific time interval. The specific time interval may be a relative value such as a value from a timing of receiving the backhaul signal (1) to a timing prior to a next radio frame or such an absolute value as 1 ms, 10 ms or the like.

D2D Rx UE Operation

Operations of UE2, UE3 and UE4 corresponding to D2D Rx UEs are the same as those of D2D broadcast/groupcast signal reception in the single cell. In particular, the D2D Rx UE attempts to detect MSG2 at a paging timing (or a predetermined MSG2 reception timing). If receiving MSG2 (1) including the cell ID, the D2D Rx UE performs the D2D broadcast/groupcast signal reception at the MSG3 transmission timing of the eNB corresponding to the received cell ID.

Figure 10:
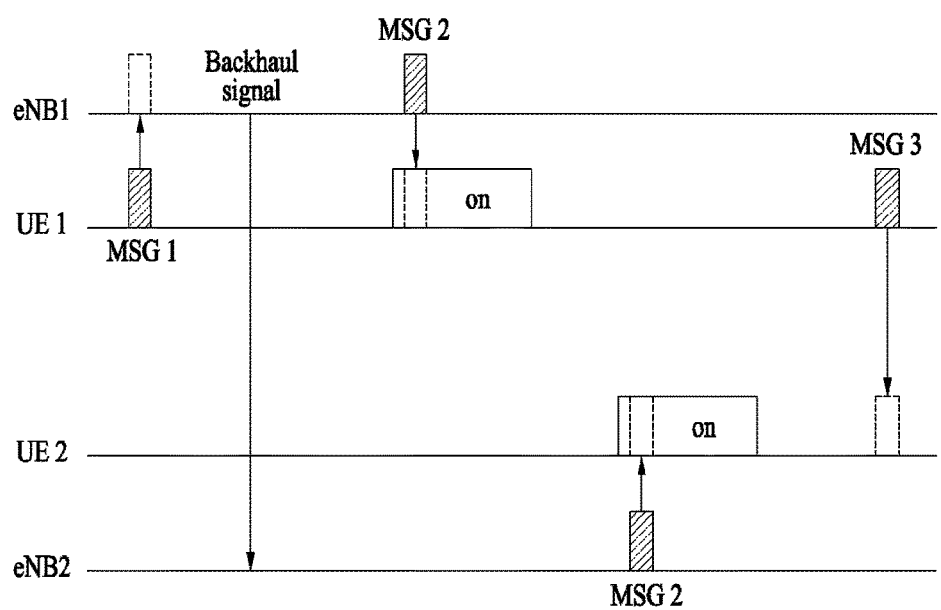
FIG. 10 is a diagram of a message transceiving procedure according to the embodiment illustrated in FIG. 9.

FIG. 10 illustrates operations of a UE and an eNB according to the $1^{st}$ embodiment of the present invention with the passage of time.

$2^{nd}$ Embodiment

According to a $2^{nd}$ embodiment, if an eNB transfers MSG3 to a neighboring eNB after receiving MSG3 from a D2D Tx UE, the neighboring eNB broadcasts the corresponding MSG3 information as the form of MSG4 for D2D Rx UEs. In particular, neighboring eNB2 receives MSG3 from eNB1 through a backhaul link and then transmits MSG2 and MSG4 to UE2 in order to forward the received MSG3. In this case, MSG3 transmission from the UE2 is omitted. In other words, MSG4 transmitted from the eNB2 includes MSG3 from the D2D Tx UE and MSG2 transmitted from the eNB2 includes RNTI information of MSG4.

Figure 11:
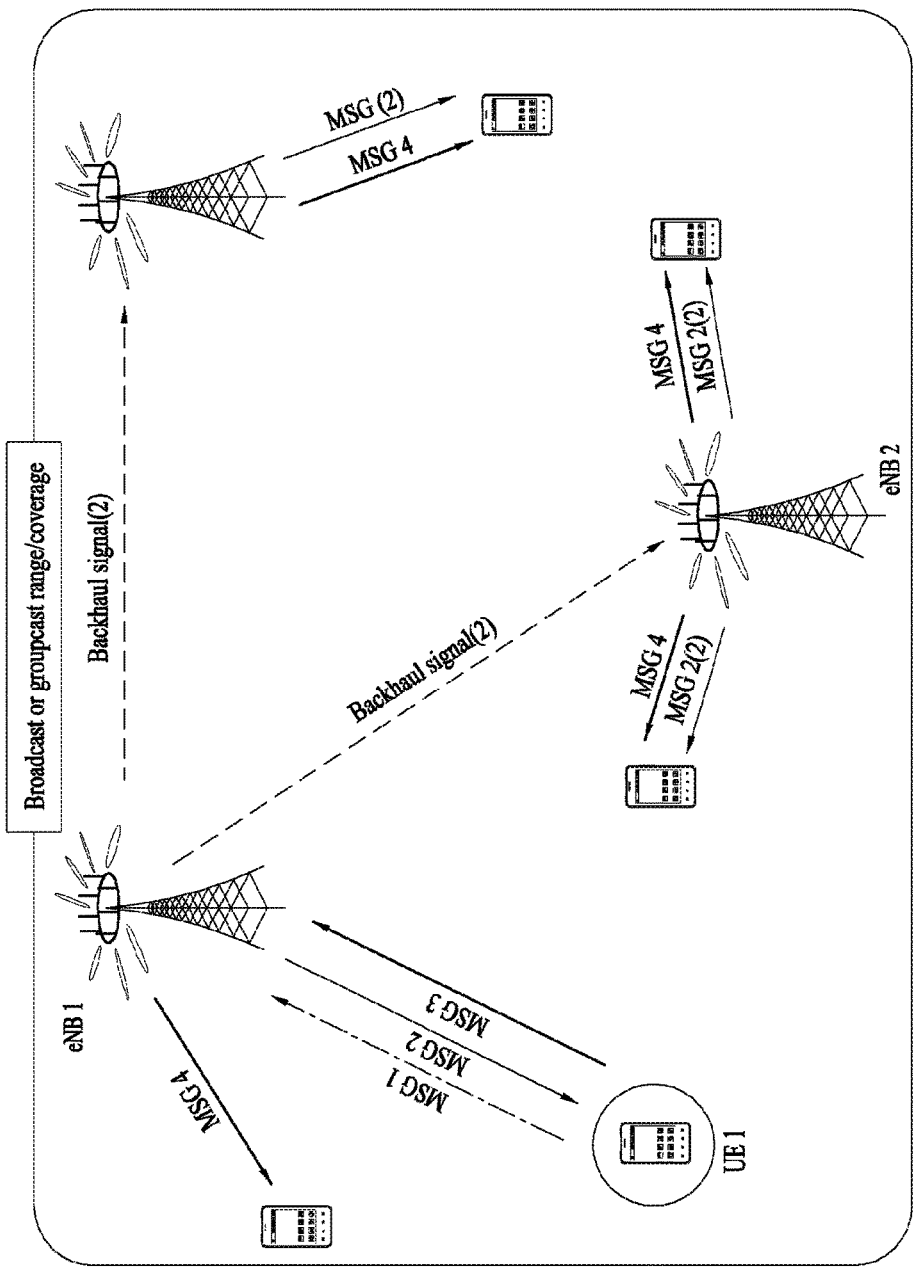
FIG. 11 is a diagram of inter-cell D2D broadcast/groupcast according to one embodiment of the present invention.

FIG. 11 illustrates the $2^{nd}$ embodiment of the present invention.

D2D Tx UE Operation

Operations of the D2D Tx UE are the same as those of the D2D broadcast/groupcast signal scheme in the single cell.

eNB Operation

If the eNB1 receives MSG1 from UE1 corresponding to the D2D Tx UE, the eNB1 may transmits MSG2 in response to the received MSG1. In this case, the eNB1 may additionally attempt MSG3 reception in an MSG3 resource region, which is scheduled by MSG2. If receiving MSG3 successfully, the eNB1 may transfer the following information to the neighboring eNB2(s).

Backhaul Signal (2)

Information included in MSG2, RA (resource allocation) information of MSG3, and TA (timing advance) information is included.

Scheduling information of MSG3

Cell ID

Information of MSG3

If the eNB2 receives the backhaul signal (2) from the eNB1, the eNB2 transmits MSG2 (2) as the same as when receiving MSG1 from UEs served by the corresponding eNB2. In this case, MSG2 (2) includes the following information.

MSG2 (2)

Information included in MSG2, RA (resource allocation) information of MSG3, and TA (timing advance) information is included.

Scheduling information of MSG3

Cell ID

Indicator for indicating whether MSG3 is received

RNTI information of MSG4

Similar to the case of the single cell, the eNB2 should transmit MSG4 during a sufficient time interval, i.e., after a timing at which all UEs are expected to receive MSG2 (2), or should transmit MSG4 repeatedly. In case that RNTI of MSG4 is determined in advance, the RNTI information of MSG4 can be omitted.

The indicator for indicating whether MSG3 is received indicates whether the D2D Rx UE, which has received MSG2 (2), attempts to receive MSG3. Simply, if the indicator is set to '0', it does not indicate the MSG3 reception. On the contrary, if the indicator is set to '1', it may be configured that the MSG3 reception is attempted. Particularly, this may be utilized for the purpose of instructing not to attempt the MSG3 reception when a UE belonging to an unsynchronized neighboring cell transmits a D2D broadcast/groupcast signal. In other cases, it may be utilized for the purpose of instructing to attempt the MSG3 reception.

If the indicator for indicating whether MSG3 is received is not included and if cell ID included in the received MSG2 (2) does not match cell ID of a cell to which the D2D Rx UE belongs, the D2D Rx UE may be configured not to attempt the MSG3 reception. On the other hand, when the indicator for indicating whether MSG3 is received is not included, the D2D Rx UE may be configured to attempt to receive MSG3 at all times. However, in this case, if the scheduling information of MSG3 is outdated, the D2D Rx UE may be configured not to attempt the MSG3 reception.

As another method, in case that a D2D Rx UE receives MSG2 (2), there is a method of enabling the D2D Rx UE to discriminate whether a D2D Tx UE belongs to the same cell by creating different types of fields or assigning different RNTI values with respect to MSG2 transmitted in response to MSG1 and MSG2 (2) transmitted through a backhaul signal.

Having transmitted MSG2 (2), the eNB2 transmits MSG4. In this case, the eNB2 may use RNTI of MSG4 in PDCCH CSS. MSG4 carries the same information as that of MSG3 received from the neighboring eNB. For RRC-connected UE, it may be possible to transfer MSG3 information using C-RNTI of each UE in PDCCH USS instead of using MSG4.

D2D Rx UE Operation

When the D2D Rx UE receives the D2D broadcast/groupcast signal, the D2D Rx UE operates as follows.

Figure 12:
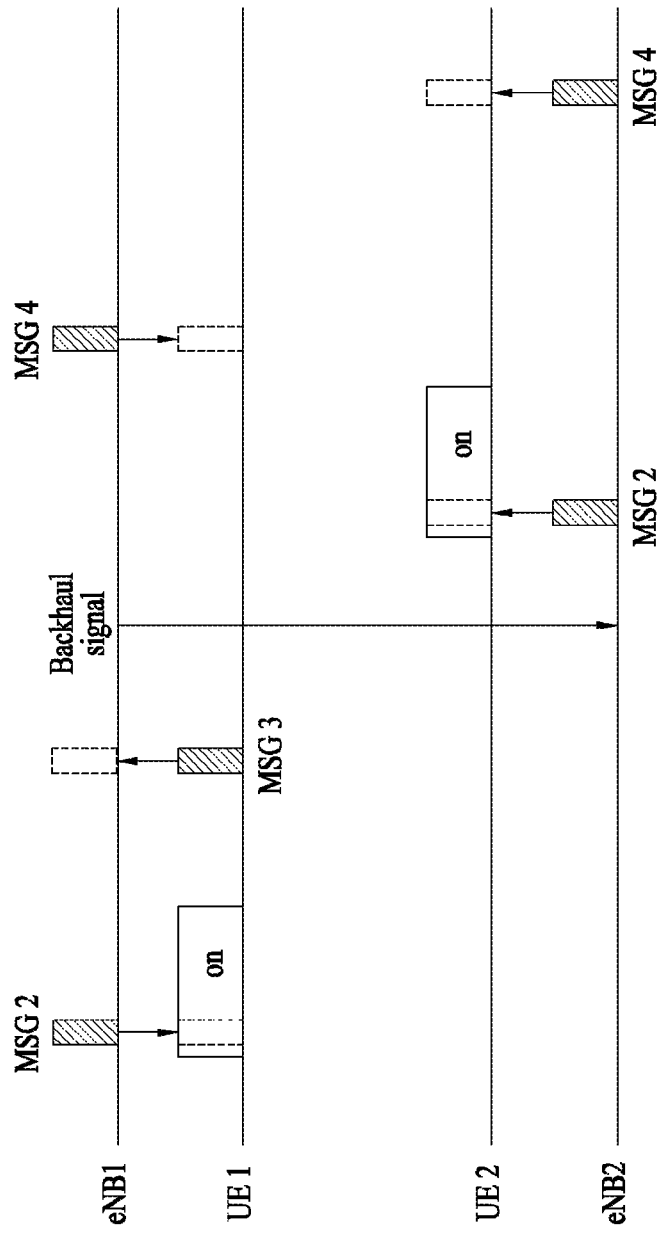
FIG. 12 is a diagram of a message transceiving procedure according to the embodiment illustrated in FIG. 11.

If receiving MSG2 (2) at a paging timing (or a predetermined MSG2 reception timing), the D2D Rx UE may receive MSG4 by attempting to detect MSG4 using RNTI of MSG4 in the PDCCH CSS. FIG. 12 illustrates a signal transceiving procedure according to the above-mentioned $2^{nd}$ embodiment of the present invention with the passage of time.

Figure 13:
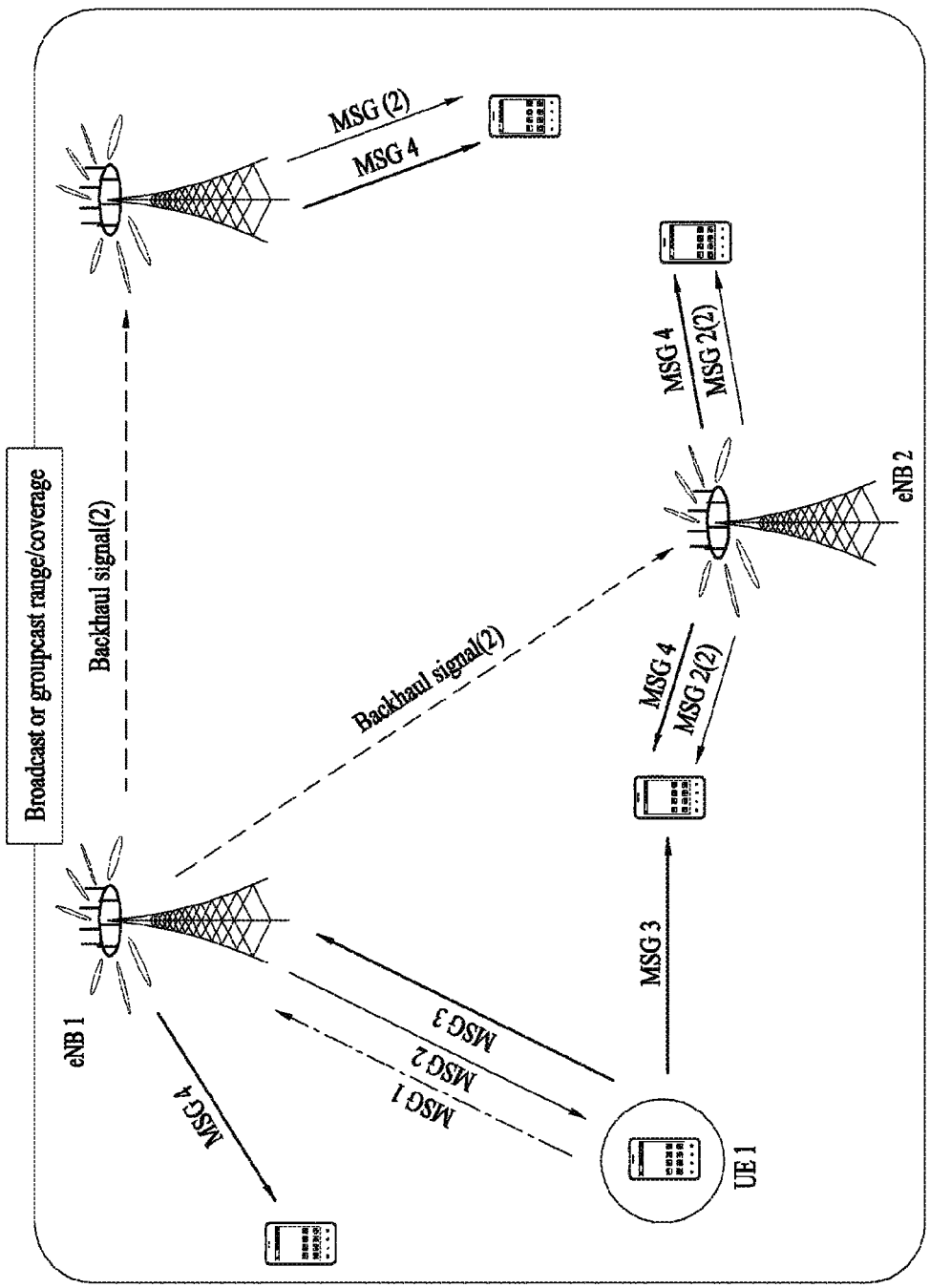
FIG. 13 is a diagram of inter-cell D2D broadcast/groupcast according to one embodiment of the present invention.
Figure 14:
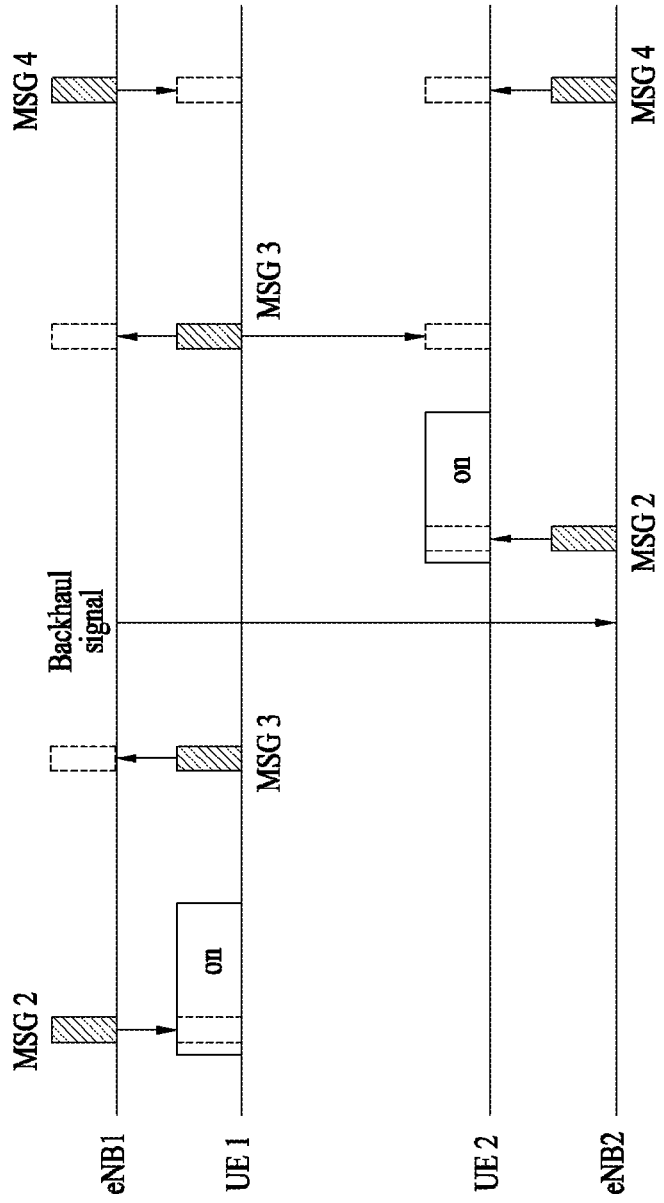
FIGS. 14 and 15 are diagrams of a message transceiving procedure according to the embodiment illustrated in FIG. 13.

FIG. 13 and FIG. 14 illustrate modified examples of the $2^{nd}$ embodiment of the present invention. Referring to FIG. 13, in addition to FIG. 11, D2D Rx UEs are able to receive MSG3 from a D2D Tx UE directly. As a matter of course, the D2D Rx UEs can receive information of MSG, i.e., D2D broadcast/groupcast signals from eNB2 through MSG4 similar to FIG. 11.

Figure 15:
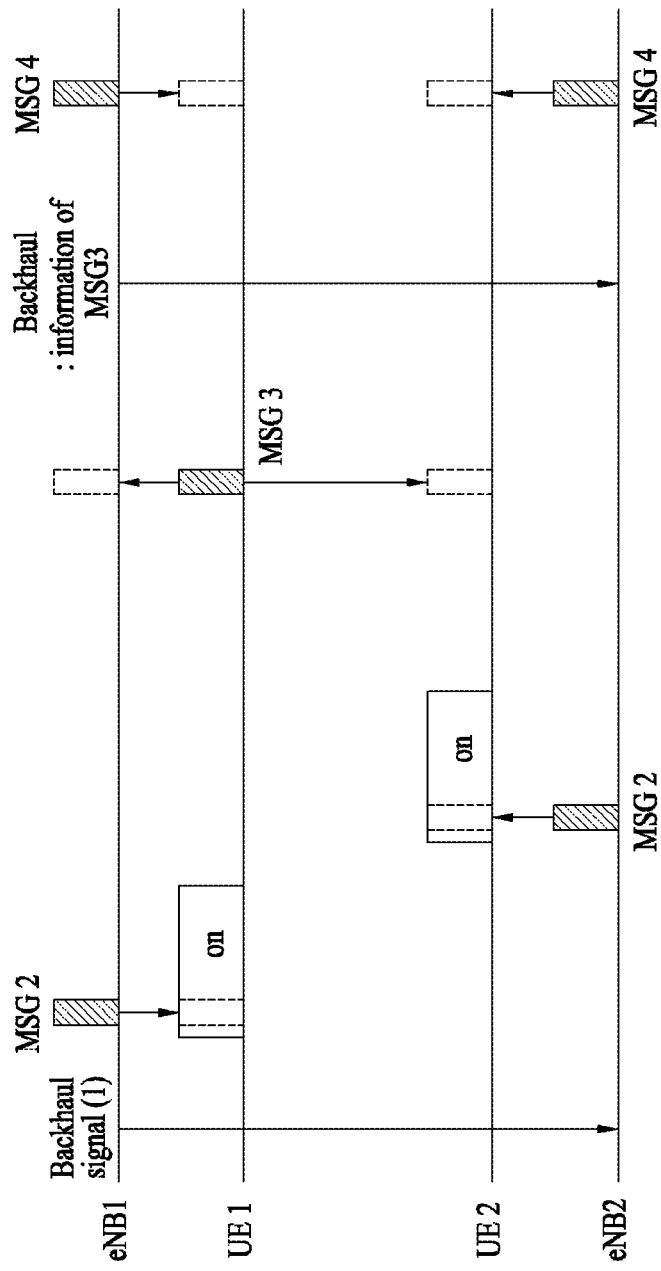

FIG. 15 illustrates a scheme of transmitting a backhaul signal between eNBs by dividing into two steps as another modified example of the $2^{nd}$ embodiment of the present invention.

Since the eNB1 is unable to obtain information of MSG3 before receiving MSG3, the eNB1 transfers only the backhaul signal (1) to the neighboring eNB2 before receiving MSG3. And, after receiving MSG3 from the UE1, the eNB1 may transfer the information of MSG3 by additionally transmitting the backhaul signal (2).

Figure 16:
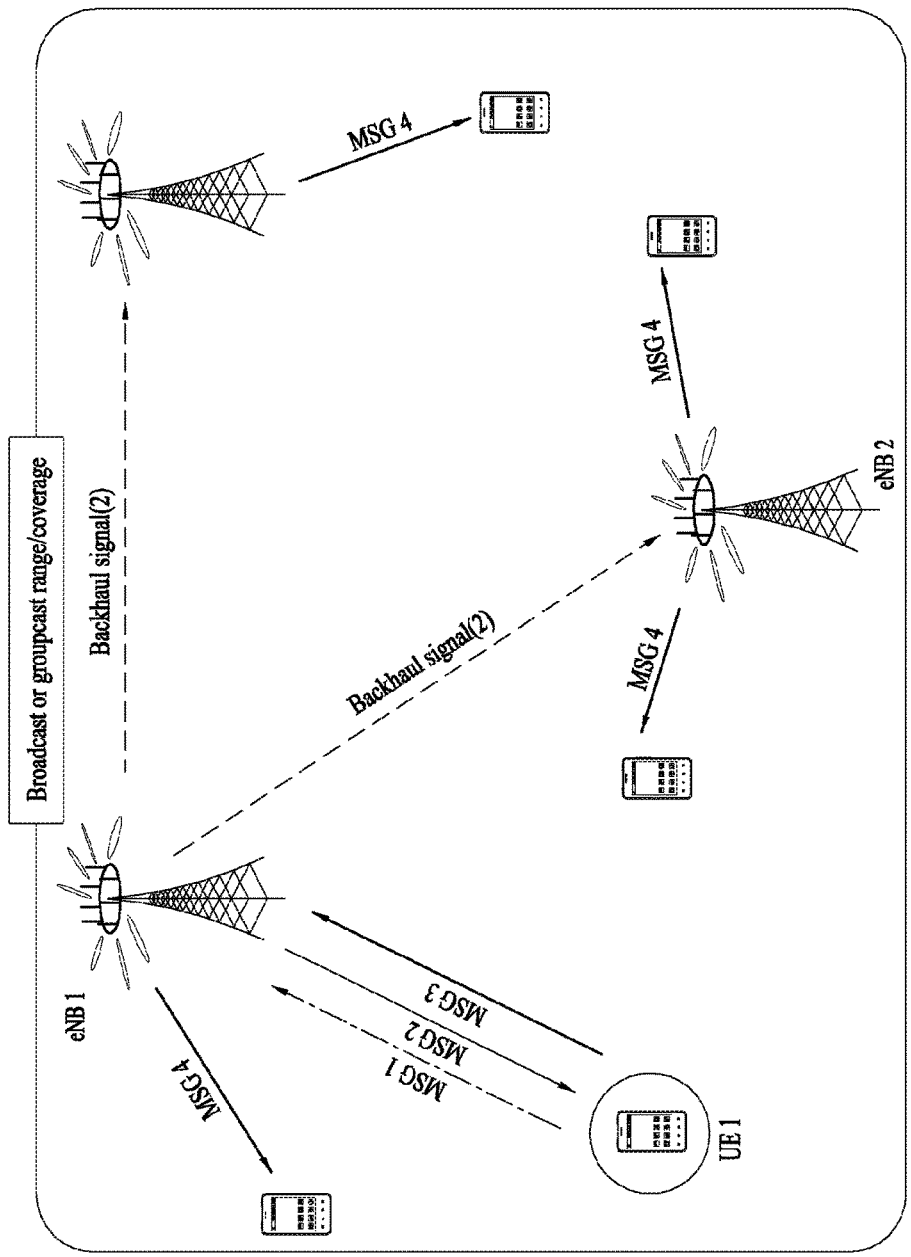
FIG. 16 is a diagram of inter-cell D2D broadcast/groupcast according to one embodiment of the present invention.
Figure 17:
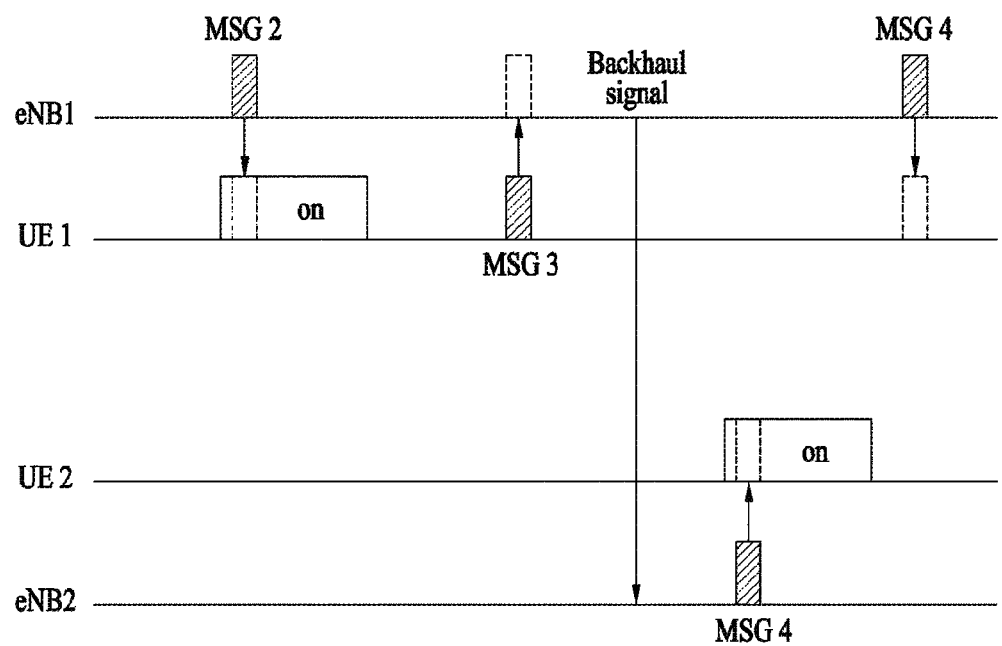
FIGS. 17 and 18 are diagrams of a message transceiving procedure according to the embodiment illustrated in FIG. 16.
Figure 18:
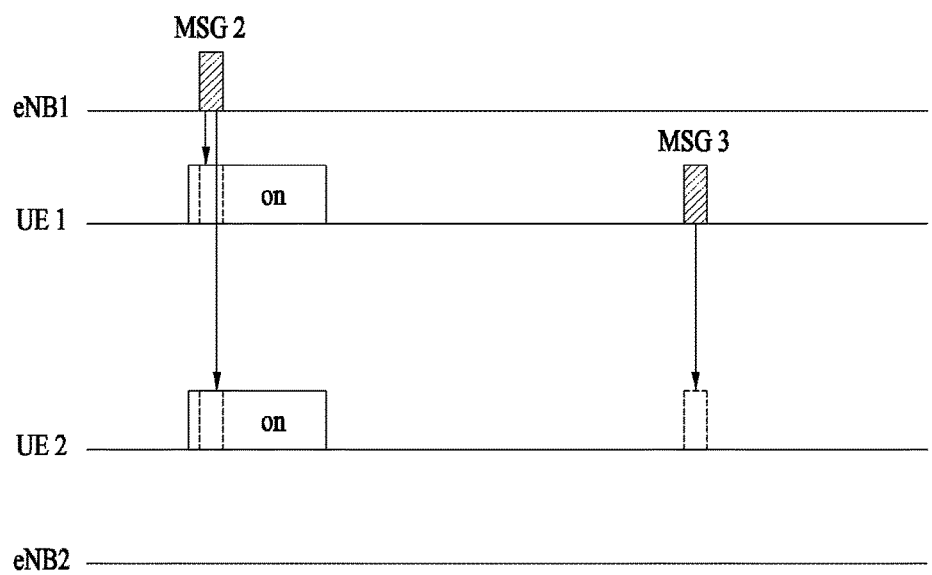

On the other hand, as a further modified example of the $2^{nd}$ embodiment of the present invention, an example of omitting transmission of MSG2 (2) may be considered when an RNTI value of MSG4 is pre-determined. FIG. 16 and FIG. 17 illustrate these modified examples.

If the eNB2 receives the backhaul signal (2), MSG4 is transmitted using the pre-determined RNTI value. In this case, a transmission timing of MSG4 may be determined in the similar manner as that used in determining a transmission timing of MSG2. In particular, the UE2 may attempt to detect MSG4 at a predetermined timing or may attempt to detect MSG4 together with paging and MSG2 at the paging timing of the UE2. In the former case, the eNB2 should transmit MSG4 at the determined timing. And, in the latter case, the eNB2 should transmit MSG4 at the paging timing of each UE group.

In this case, the operations of UEs are also changed. The operations of the D2D Tx UE are the same as those in the single cell. However, in the case of the D2D Rx UE, when attempting to detect MSG2, the D2D Rx UE may attempt to detect MSG4 together with MSG2 using the predetermined RNTI value. Alternatively, the D2D Rx UE may attempt to detect MSG4 using the predetermined RNTI value at the determined MSG4 transmission timing additionally.

$3^{rd}$ Embodiment

Another embodiment of the present invention relates to a method for a UE to transmit a D2D broadcast/groupcast signal by accessing multiple cells.

eNB Operation

Operations of an eNB are the same as those in a D2D broadcast/groupcast procedure in the single cell environment.

D2D Rx UE Operation

Operations of a D2D Rx UE are the same as those in the D2D broadcast/groupcast procedure in the single cell environment.

D2D Tx UE Operation

A D2D Tx UE sequentially matches synchronization with neighboring eNBs in a random sequence and may then perform a D2D broadcast/groupcast procedure identical to that in the single cell environment with respect to each of the eNBs. In particular, after performing downlink synchronization with the neighboring eNB, the D2D Tx UE transmits MSG1 and may then attempt detection of MSG2 at an MSG2 reception timing. If receiving MSG2 from the neighboring eNB, the D2D Tx UE transmits MSG3 at an MSG3 transmission timing, which is contained in MSG2. Thereafter, the D2D Tx UE may receive MSG4 from the neighboring eNB.

$4^{th}$ Embodiment

A further embodiment of the present invention relates to a method for a D2D Rx UE to receive a D2D broadcast/groupcast signal by accessing multiple cells eNB Operation Operations of an eNB are the same as those in a D2D broadcast/groupcast procedure in the single cell environment.

D2D Tx UE Operation

Operations of a D2D Tx UE are the same as those in the D2D broadcast/groupcast procedure in the single cell environment.

D2D Rx UE Operation

UEs that do not request D2D broadcast/groupcast transmission, i.e., UEs that do not transmit MSG1 but attempt MSG2 detection may be in a position of a D2D Rx UE be provisionally. Such a UE sequentially matches synchronization with neighboring eNBs in a random sequence and may then receive MSG2 from the neighboring eNBs. In this case, since the UE is unable to know a paging timing of a UE belonging to a neighboring cell, the corresponding UE should attempt the MSG2 detection in a plurality of consecutive SFs. However, if there are a transmission timing and a period of MSG2, which are previously defined, the corresponding UE may not perform a plurality of detection attempts since it can be synchronized at the corresponding timing by obtaining DL synchronization.

On the other hand, in case that a UE is synchronized with a plurality of eNBs, an eNB serving a D2D Tx UE has difficult in that it should transmit MSG2 during a sufficient time interval by considering time required until a D2D Rx UE visits the corresponding eNB.

Details of operations of a UE that receives MSG2 according to the $1^{st}$ and $2^{nd}$ embodiments of the present invention are explained in the following description.

1) A case that the D2D Rx UE and the D2D Tx UE belong to the same eNB

The D2D Rx UE may obtain the timing at which MSG3 is transmitted based on the scheduling information of MSG3, i.e., an index of SF and a TA value assigned for the MSG3 transmission. In other words, the D2D Rx UE considers a timing prior to a symbol interval corresponding TA from a starting point of the received SF as the transmission timing of MSG3. This is based on the assumption that the D2D Tx UE is located nearby with the D2D Rx UE. Thus, it is also assumed that a propagation delay between the D2D Tx and the D2D Rx UE and effect of TA value difference between the D2D Tx and the D2D Rx UE are absorbed by CP. If the amount of corresponding error is not negligible, the D2D Rx UE is expected to receive MSG3 in an interval of some symbols before or after the timing at which the MSG3 transmission is expected.

2) A case that the D2D Rx UE and the D2D Tx UE belong to different eNBs

In case that the timing is synchronized between the eNBs, the D2D Rx UE may obtain the timing at which MSG3 is transmitted based on the scheduling information of MSG3, i.e., the index of the SF and the TA value assigned for the MSG3 transmission. On the contrary, if SF and/or a symbol timing is not synchronized between the eNBs, it may cause a problem that the D2D Rx UE is unable to know reference time of the scheduling information of MSG3.

Thus, if receiving MSG2, the D2D Rx UE is configured to attempt to receive PSS/SSS (primary synchronization signal/secondary synchronization signal) of an eNB corresponding to the cell ID. By receiving the PSS/SSS, the D2D Rx UE may obtain information on SFN and SF boundaries of the corresponding eNB. In addition, the D2D Rx UE may adjust frequency synchronization by decoding CRS (cell-specific reference signal) and the like. Hence, the D2D Rx UE may obtain the MSG3 transmission timing of the D2D Tx UE from the information received through MSG2.

As another method, if receiving MSG2, the D2D Rx UE may obtain the MSG3 transmission timing from the scheduling information of MSG3, i.e., the index of the SF and the TA value assigned for the MSG3 transmission since the D2D Rx UE is measuring DL synchronization difference between the neighboring eNBs and the eNB serving the corresponding D2D Rx UE.

Figure 19:
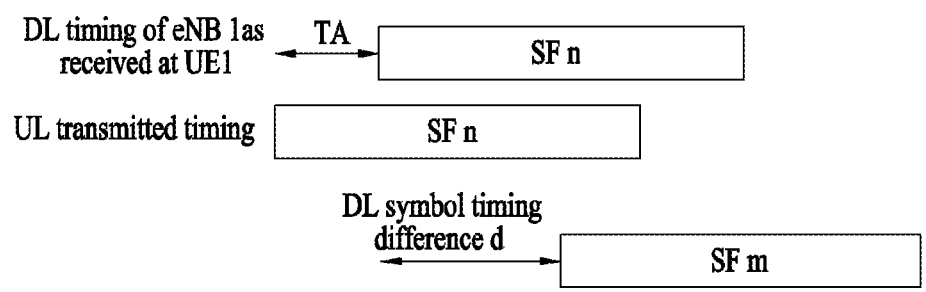
FIG. 19 illustrates a difference between reception (or transmission) timings of UEs served by different cells.

As shown in FIG. 19, if an index of SF in which MSG3 of the D2D Tx UE (UE1) is transmitted is set to n, since the D2D Rx UE is measuring symbol spacing between SF boundaries of the eNB1 and the eNB2, $\delta$ and difference between SF indices, $\Delta=(m-n)$, the D2D Rx UE may know that a transmission position of MSG3 is a position prior to TA+$\delta$ symbols from a starting point of its DL SF index, m=n+A.

However, in this case, since the propagation delay between UEs and the TA difference between the D2D Tx UE and the D2D Rx UE with respect to the eNB corresponding to the cell ID are not considered similar to the case 1), the D2D Rx UE is expected to receive MSG3 in an interval of some symbols before or after the timing at which the MSG3 transmission is expected.

Meanwhile, a UE may measure DL time synchronization difference between neighboring eNBs or DL time synchronization difference between a reference eNB (predetermined eNB that becomes D2D time reference) and an eNB serving the UE and then report it to the eNB. In this case, the above-mentioned measurement may be performed at a statically/semi-statically determined timing periodically or at a dynamically determined timing during initial UE operations.

If the eNB receives the backhaul signal (1) or the backhaul signal (2) while holding information on the synchronization difference between the eNBs, the eNB changes the scheduling information of the received MSG3 into its radio frame, subframe, symbol index and the like by considering synchronization difference between itself and the eNB corresponding to the cell ID. Thereafter, the eNB may inform a UE. In this case, the UE considers a scheduling timing of MSG3, which is transferred by the eNB, as an actual transmission timing of MSG3.

In reporting the synchronization difference, the UE may report difference between a DL SF boundary of its cell and a DL SF boundary of a neighboring cell (e.g., DL radio frame, subframe, and symbol difference). Alternatively, the UE may report information of WAN UL, which is affected by MSG3 reception. Particularly, it may be reported that which timing (e.g., DL radio frame, subframe, and symbol difference) in UL of the D2D Rx UE corresponds to a UL SF boundary of the D2D Tx UE. In the case of the D2D Tx UE, if the MSG3 transmission timing is configured with reference to a timing of a different cell instead of that of the cell to which the D2D Tx UE belongs, the D2D Tx UE should measure synchronization difference with respect to the different cell that becomes the reference and then report it to a serving eNB.

Figure 20:
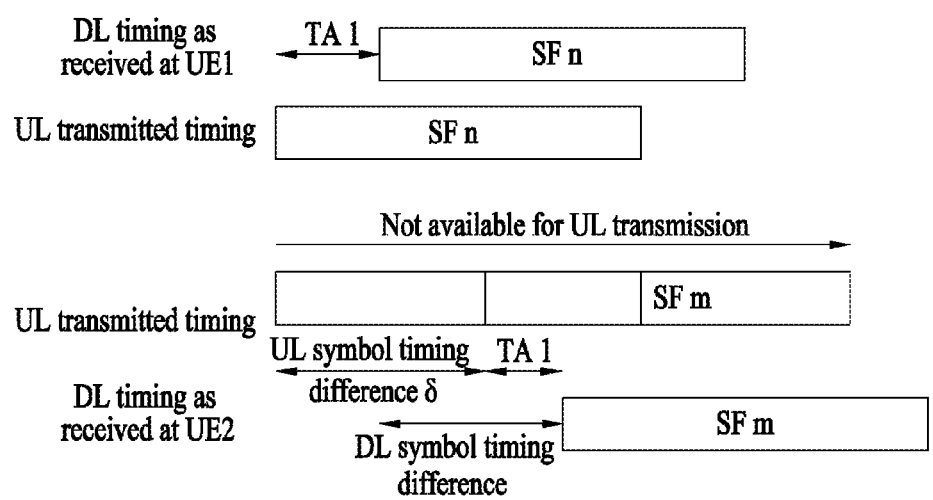
FIG. 20 illustrates alignment between reception or transmission timings of UEs served by different cells.

For instance, if UL SF m of the D2D Rx UE (UE2) corresponds to UL SF n of the D2D Tx UE (UE1) and if synchronization is mismatched as shown in FIG. 20, the UE2 may report difference between UL SF boundaries, $\delta$ and difference between SF indices, $\Delta=(m-n)$ to its serving eNB, eNB2. In other words, the UE2 may report to the eNB2 which SF in UL of the UE2 corresponds to timings of both boundaries of random SF n of the UE1. In FIG. 20, since a transmission interval of the UL SF n of the UE1 ranges between the UL SF m of the UE2 and SF (m-1), SF indices to be reported to the eNB2 are m and (m-1).

The reporting from the UE2 may be performed at a reporting timing, which is configured independent from the D2D broadcast/groupcast procedure. Alternatively, the UE2 may perform the reporting in a manner of obtaining the scheduling information of MSG3 by receiving MSG2 and then reporting timing difference between a boundary of SF in which MSG3 transmission is expected and a boundary its UL SF.

In other words, the UE2 may be configured to use two consecutive UL SFs for one-time MSG3 transmission and reception. Referring to FIG. 20, the UE2 estimates SF m and SF (m-1) as an interval in which MSG3 is transmitted and may then attempt to receive MSG3 in the two consecutive SFs. In this case, the UE2 may select the two consecutive SFs as follows. The UE 2 determines an SF number of which a starting point (or an end point) of a boundary is located in transmission SF for MSG3, which is obtained from the scheduling information of MSG3. Then, the UE2 determines the corresponding SF and SF immediately before the corresponding SF (or SF immediately after the corresponding SF) as the interval in which MSG3 is transmitted.

In this case, in comparing the SF boundary of the UE2 and the transmission SF for MSG3, the UE2 may set DL SF as reference. Alternatively, if the UE2 is able to obtain the TA value, the UE2 may set UL SF as reference by applying the TA value.

As mentioned in the foregoing description, if the eNB2 receives measurement information (e.g., synchronization difference information or SF index) from the UE2, the eNB2 does not perform WAN UL scheduling on the two consecutive SFs. In particular, in the case of FIG. 20, the eNB2 may not perform UL scheduling on the SF m and the SF (m-1).

Even if the UE2 does not know an accurate MSG3 transmission timing in the interval consisting of the corresponding two SFs, the UE2 may obtain synchronization with respect to the MSG3 transmission timing since a preamble is included in MSG3 transmitted by the UE1.

In addition, to calculate more accurate MSG3 transmission timing, GPS information of the D2D Tx UE may be included in the backhaul signal (1) or (2), or MSG2 (1) or (2). In this case, after receiving the corresponding information, the D2D Rx UE may calculate a distance-based propagation delay based on GPS coordinate information of the D2D Tx UE and GPs coordinate information of the D2D Rx UE. Moreover, the UE2 may additionally adjust the propagation delay when calculating the MSG3 transmission timing. In other words, a timing after the propagation delay from the MSG3 transmission timing becomes MSG3 reception timing.

The above-mentioned UE operations and eNB operations are not necessarily limited with respect to MSG3 transmission. If transmission timings of D2D unicast/multicast/groupcast/broadcast data transmitted from UEs belonging to difference cells and a discovery signal are mismatched with a receiver UE, the above-mentioned UE operations and eNB operations can be used for data and signal reception, respectively.

Figure 21:
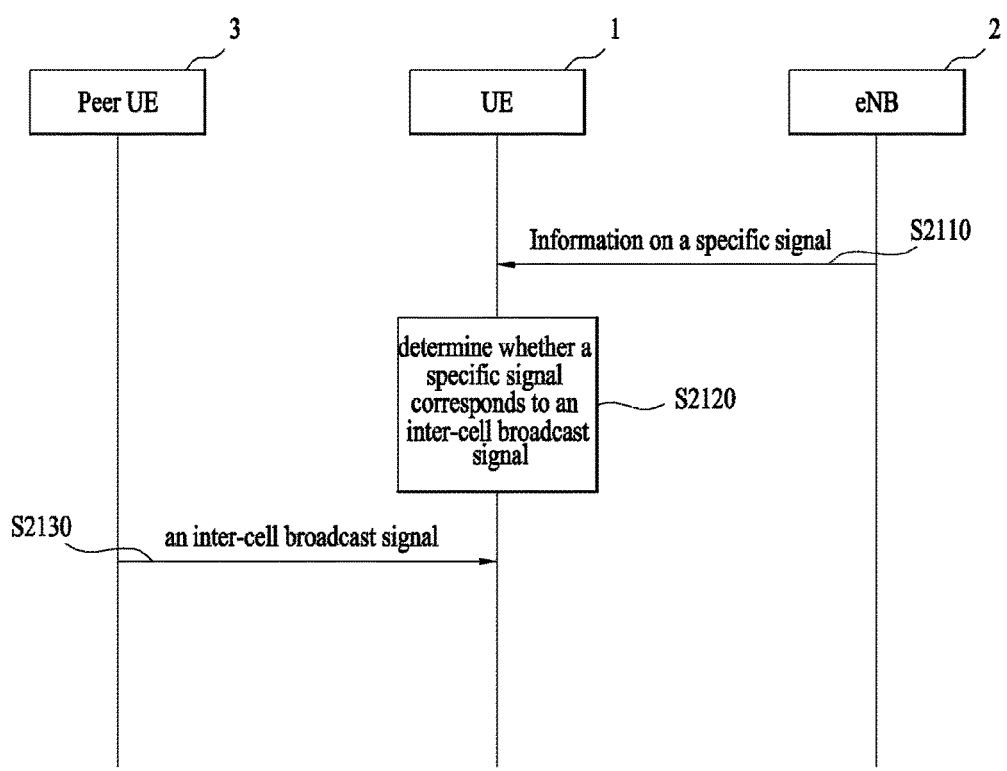
FIG. 21 is a flow diagram to explain operations according to the embodiment(s) of the present invention.

FIG. 21 illustrates operations according to one embodiment of the present invention. UE(1) corresponds to a UE configured to perform D2D communication with peer UE(3). And, eNB(2) corresponds to a serving eNB of the UE(1).

The UE(1) may receive a message including information on a specific signal from the eNB(2) [S2110]. The message may include scheduling information on the specific signal, and more particularly, information on allocation of a radio resource, in which the specific signal will be transmitted.

After receiving the message, the UE(1) may determine whether the specific signal corresponds to an inter-cell broadcast signal to be transmitted by the peer UE(3) based on the information included in the message [S2120]. If a signal to be transmitted by the peer UE(3) is an inter-cell broadcast signal, the UE(1) may receive the inter-cell broadcast signal from the peer UE(3) using the information included in the message and information on a synchronization difference between the serving eNB and a neighboring eNB [S2130].

Information on the signal to be transmitted by the peer UE(3) may include at least one selected from the group consisting of resource allocation information for the signal, a modulation and coding scheme, TA (timing advance) information, an index of a subframe having transmission of the signal assigned thereto, and cell ID (identifier) of the neighboring eNB.

The information on the signal to be transmitted by the peer UE(3) is received by the serving eNB(2) from the neighboring eNB through a backhaul link. A transmission timing of the message may be determined in a prescribed range from a reception timing of the information on the signal to be transmitted by the peer UE(3).

The information on the synchronization difference may include information on subframe difference between the two eNBs. And, the information on the subframe difference may include a subframe index difference and symbol spacing between subframe boundaries of the two eNBs.

The information on the synchronization difference may include indices of subframes, which correspond to a specific subframe of the serving eNB, of the neighboring eNB.

The message may include geographic coordinate information of the peer UE(3). The UE(1) may adjust a propagation delay that depends on a distance from the peer UE(3) using the geographic coordinate information.

Meanwhile, in the step S2130, the information on the synchronization difference may be omitted. In particular, in case that synchronization difference is measured by each UE and is then reported to each serving eNB, the eNB(2) may transmit the message by including information having the synchronization difference reflected therein in the message. In this case, the UE(1) does not need to perform adjustment for the synchronization difference. However, in this case, the UE(1) may perform the propagation delay adjustment based on the geographic coordinate information.

Although the embodiments of the present invention are explained in brief with reference to FIG. 21, the embodiment related to FIG. 21 may include at least some of the above-mentioned embodiment(s) alternatively or additionally.

Figure 22:
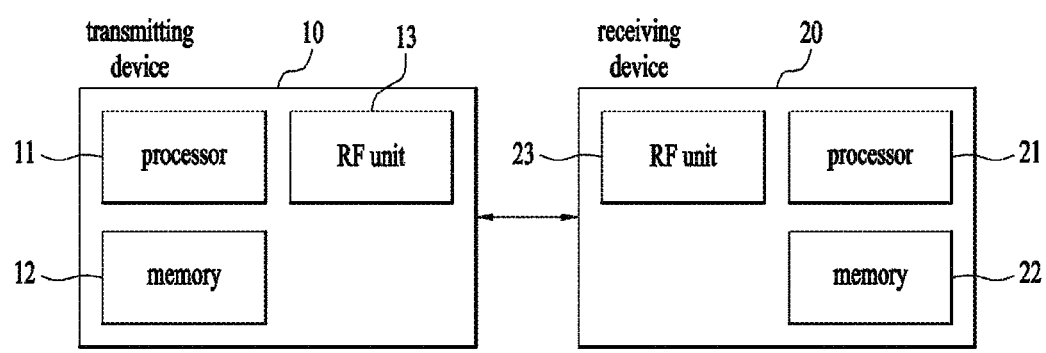
FIG. 22 is a block diagram of devices for implementing the embodiment(s) of the present invention.

FIG. 22 is a block diagram of a transmitting device 10 and a receiving device 20 configured to implement exemplary embodiments of the present invention. Referring to FIG. 22, the transmitting device 10 and the receiving device 20 respectively include radio frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the RF unit 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include Nt (where Nt is a positive integer) transmit antennas.

A signal processing process of the receiving device 20 is the reverse of the signal processing process of the transmitting device 10. Under the control of the processor 21, the RF unit 23 of the receiving device 10 receives RF signals transmitted by the transmitting device 10. The RF unit 23 may include Nr receive antennas and frequency down-converts each signal received through receive antennas into a baseband signal. The RF unit 23 may include an oscillator for frequency down-conversion. The processor 21 decodes and demodulates the radio signals received through the receive antennas and restores data that the transmitting device 10 wishes to transmit.

The RF units 13 and 23 include one or more antennas. An antenna performs a function of transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An RF unit supporting a MIMO function of transmitting and receiving data using a plurality of antennas may be connected to two or more antennas.

In embodiments of the present invention, a UE serves as the transmission device 10 on uplink and as the receiving device 20 on downlink. In embodiments of the present invention, an eNB serves as the receiving device 20 on uplink and as the transmission device 10 on downlink.

The transmitting device and/or the receiving device may be configured as a combination of one or more embodiments of the present invention.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The present invention may be used for a wireless communication apparatus such as a terminal, a relay and a base station (BS).

What is claimed is:

1. A method of receiving a D2D (device-to-device) signal by a user equipment (UE) configured to perform D2D communication in a wireless communication system, the method comprising the steps of:
receiving a message including information on a specific signal from a serving base station (BS),
wherein the information on the specific signal is received by the serving BS from a neighboring BS through a backhaul link;
determining whether the specific signal corresponds to an inter-cell broadcast signal to be transmitted by a peer UE served by a neighboring BS based on the information included in the message,
wherein the inter-cell broadcast signal is a signal between a cell of the neighboring BS and a cell of the serving BS; and
when the specific signal corresponds to the inter-cell broadcast signal, receiving, from the peer UE, the inter-cell broadcast signal using the information on the specific signal included in the message and information on a time synchronization difference between the serving BS and the neighboring BS,
wherein the information on the time synchronization difference comprises information on a subframe difference between the serving BS and the neighboring BS, and
wherein the time synchronization difference is set so that a time required for the backhaul link transmission is secured.

2. The method of claim 1, wherein the information on the specific signal comprises at least one selected from the group consisting of resource allocation information for the specific signal, a modulation and coding scheme, TA (timing advance) information, an index of a subframe to which transmission of the specific signal is assigned, and a cell ID (identifier) of the neighboring BS.

3. The method of claim 1,
wherein a transmission timing of the message is determined in a prescribed range from a reception timing of the information on the specific signal.

4. The method of claim 1,
wherein the information on the subframe difference comprises a subframe index difference and symbol spacing between subframe boundaries of the serving BS and the neighboring BS.

5. The method of claim 1, wherein the message comprises geographic coordinate information of the peer user equipment.

6. The method of claim 5, further comprising the step of adjusting a propagation delay depending on a distance from the peer user equipment using the geographic coordinate information.

7. A user equipment (UE) configured to perform D2D (device-to-device) communication in a wireless communication system, comprising:
a radio frequency (RF) unit; and
a processor configured to:
control to RF unit to receive a message including information on a specific signal from a serving base station (BS),
wherein information on the specific signal to be transmitted is received by the serving BS from the neighboring BS through a backhaul link;
determine whether the specific signal corresponds to an inter-cell broadcast signal to be transmitted by a peer UE served by a neighboring BS based on the information included in the message,
wherein the inter-cell broadcast signal is a signal between a cell of the neighboring BS and a cell of the serving BS; and
when the specific signal corresponds to the inter-cell broadcast signal, control the RF unit to receive, from the peer UE, the inter-cell broadcast signal using the information included in the message and information on a time synchronization difference between the serving BS and the neighboring BS,
wherein the information on the time synchronization difference comprises information on a subframe difference between the serving BS and the neighboring BS, and wherein the time synchronization difference is set so that a time required for the backhaul link transmission is secured.

8. The UE of claim 7, wherein the information on the specific signal comprises at least one selected from the group consisting of resource allocation information for the specific signal, a modulation and coding scheme, TA (timing advance) information, an index of a subframe to which transmission of the specific signal is assigned, and a cell ID (identifier) of the neighboring BS.

9. The UE of claim 7,
wherein a transmission timing of the message is determined in a prescribed range from a reception timing of the information on the specific signal.

10. The UE of claim 7,
wherein the information on the subframe difference comprises a subframe index difference and symbol spacing between subframe boundaries of the serving BS and the neighboring BS.

11. The UE of claim 7, wherein the message comprises geographic coordinate information of the peer UE.

12. The UE of claim 11, wherein the processor is configured to adjust a propagation delay depending on a distance from the peer UE using the geographic coordinate information.

* * * * *